(12) United States Patent
Yang

(10) Patent No.: US 10,810,813 B1
(45) Date of Patent: Oct. 20, 2020

(54) SMART LOCK DEVICE AND METHOD

(71) Applicant: Frank Yang, Irvine, CA (US)

(72) Inventor: Frank Yang, Irvine, CA (US)

(*) Notice: Subject to any disclaimer, the term of this patent is extended or adjusted under 35 U.S.C. 154(b) by 0 days.

(21) Appl. No.: 16/814,901

(22) Filed: Mar. 10, 2020

Related U.S. Application Data

(63) Continuation of application No. 16/506,965, filed on Jul. 9, 2019, now Pat. No. 10,643,412.

(51) Int. Cl.
| | | |
|---|---|---|
| *G07C 9/00* | (2020.01) | |
| *H04N 7/18* | (2006.01) | |
| *E05B 17/00* | (2006.01) | |
| *E05B 47/00* | (2006.01) | |

(52) U.S. Cl.
CPC ...... *G07C 9/00563* (2013.01); *E05B 17/0083* (2013.01); *E05B 47/00* (2013.01); *G07C 9/00174* (2013.01); *G07C 9/00309* (2013.01); *G07C 9/00571* (2013.01); *H04N 7/183* (2013.01); *H04N 7/186* (2013.01)

(58) Field of Classification Search
CPC ............ G07C 9/00174; G07C 9/00309; G07C 9/00563; G07C 9/00571; E05B 47/00; H04N 7/186; H04N 7/183
See application file for complete search history.

(56) References Cited

U.S. PATENT DOCUMENTS

| | | | | |
|---|---|---|---|---|
| 10,053,056 B1* | 8/2018 | Zhang | .................. | B60R 25/252 |
| 10,389,983 B1* | 8/2019 | Fu | .......................... | H04N 7/185 |
| 2003/0075930 A1* | 4/2003 | Mak | ........................ | E05B 63/06 |
| | | | | 292/1.5 |
| 2008/0042452 A1* | 2/2008 | Moon | .................... | E05B 63/044 |
| | | | | 292/337 |
| 2008/0231060 A1* | 9/2008 | Carabalona | ............. | E05B 83/32 |
| | | | | 292/251.5 |
| 2016/0171808 A1* | 6/2016 | Caterino | ................. | H04N 7/186 |
| | | | | 340/5.61 |
| 2016/0180620 A1* | 6/2016 | Eyring | ................ | G07C 9/00309 |
| | | | | 235/382 |
| 2017/0180539 A1* | 6/2017 | Payack, Jr. | .............. | G07C 9/00 |
| 2017/0191287 A1* | 7/2017 | Mittleman | .............. | H02J 7/025 |
| 2018/0108192 A1* | 4/2018 | Ho | ...................... | G07C 9/00896 |
| 2019/0277057 A1* | 9/2019 | Brown | ............... | G07C 9/00896 |

* cited by examiner

*Primary Examiner* — Andrew W Bee
(74) *Attorney, Agent, or Firm* — Arman Khosraviani

(57) ABSTRACT

A smart lock device comprising at least one memory, one or more sensors, for acquiring one or more verification parameters, visual information, or audio information from a surrounding environment of a current user, a processor coupled to the at least one memory configured to receive from the one or more sensors, a first verification parameter from the current user, wherein the first verification parameter includes biometric information from the current user, and wherein the processor is configured to cause: a first action upon detecting the current user at a first predetermined distance within a first geographical zone, the first action comprising of collecting visual information or audio information from the surrounding environment, and a second action, upon detecting the current user at a second predetermined distance within a second geographical zone, the second action comprising of acquiring the first verification parameter from the current user.

23 Claims, 7 Drawing Sheets

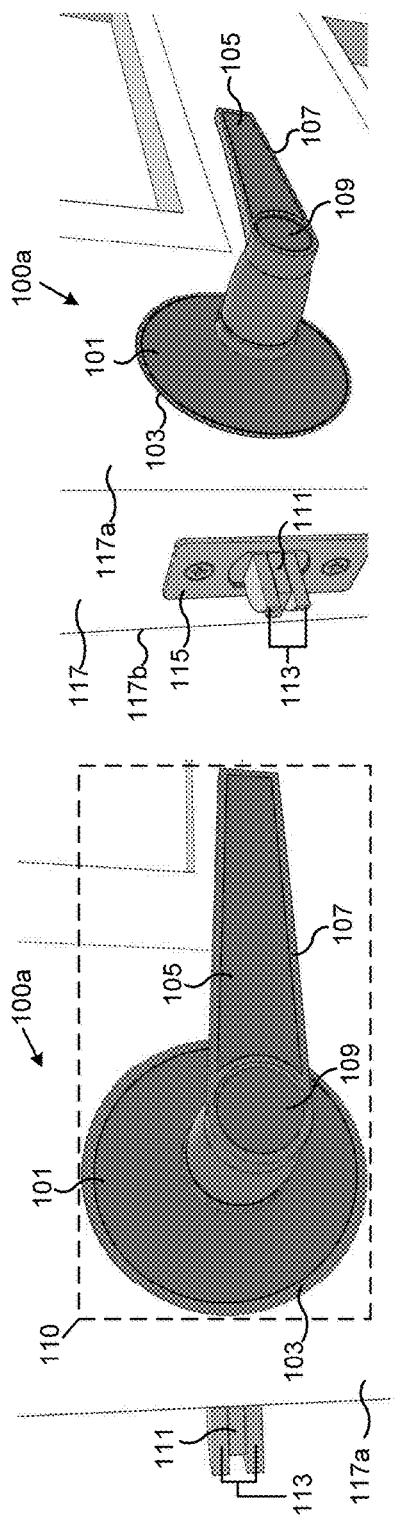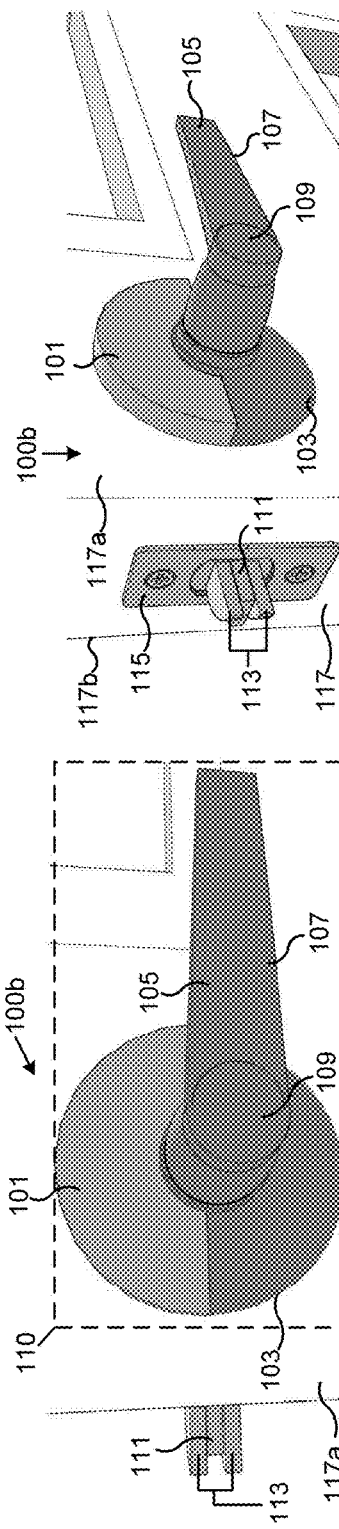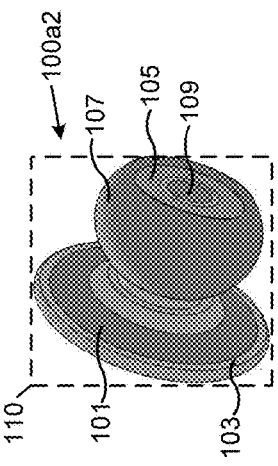

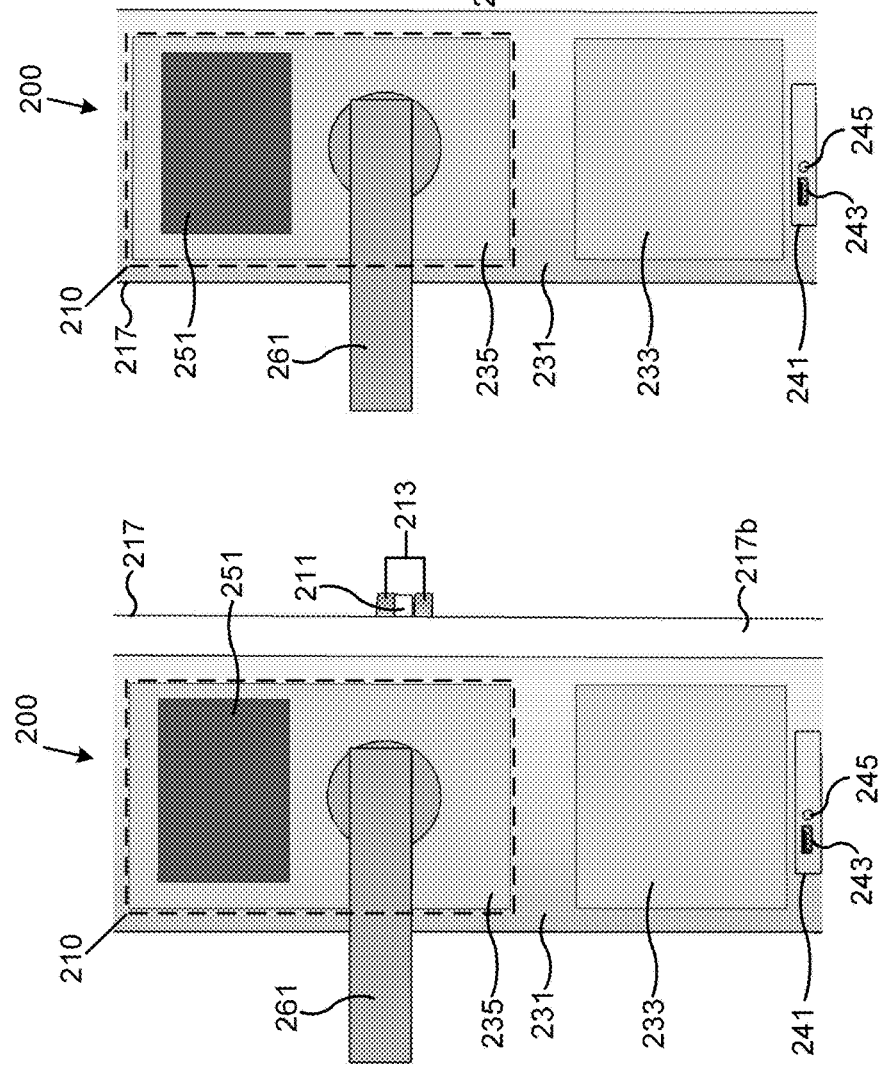
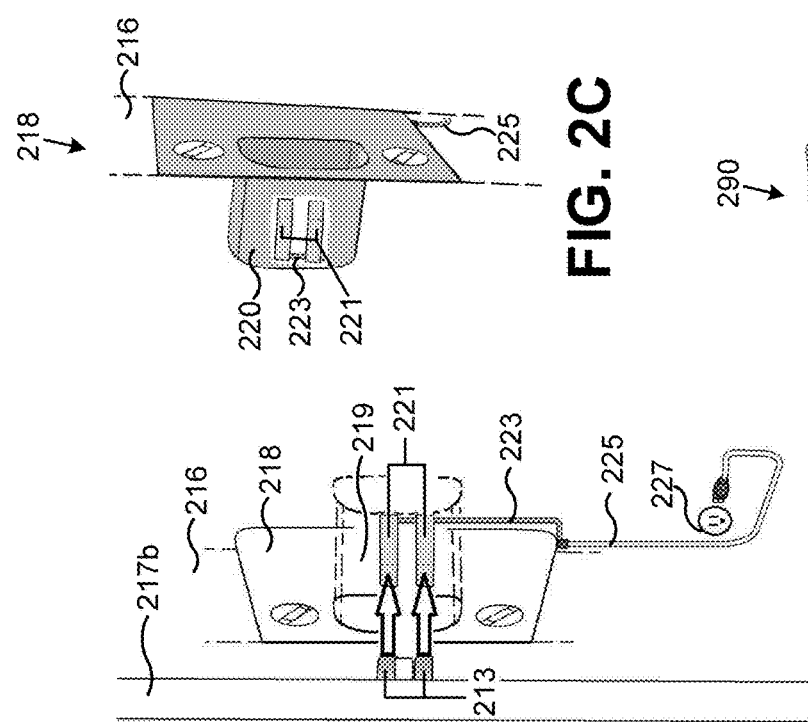
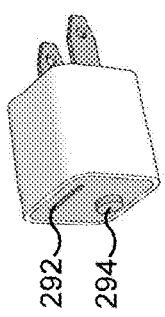
FIG. 2A
FIG. 2B
FIG. 2C
FIG. 2D

SMART LOCK DEVICE AND METHOD

CROSS-REFERENCE TO RELATED APPLICATIONS

The entire contents of the following applications are incorporated herein by reference: U.S. Nonprovisional patent application Ser. No. 15/386,670; filed on Dec. 21, 2016; and entitled AUTONOMOUS PAIRING OF INTERNET OF THINGS DEVICES. U.S. Nonprovisional patent application Ser. No. 15/454,446; filed on Mar. 9, 2017; and entitled DUAL VIDEO SIGNAL MONITORING AND MANAGEMENT OF A PERSONAL INTERNET PROTOCOL SURVEILLANCE CAMERA. Nonprovisional patent application Ser. No. 15,488,211 filed on Apr. 14, 2017; and entitled AN INTERACTIVE AUGMENTED-REALITY IoT DEVICES SYSTEMS AND METHODS. Nonprovisional patent application Ser. No. 15490826 filed on Apr. 18, 2017; and entitled GARAGE DOOR CONTROLLER AND MONITORING SYSTEM AND METHOD. Nonprovisional patent application Ser. No. 15620749 filed on Jun. 12, 2017; and entitled SMART REGISTER DEVICE AND METHOD. Nonprovisional patent application Ser. No. 15625601 filed on Jun. 16, 2017; and entitled SMART FAN AND VENTILLATION DEVICE AND METHOD. Nonprovisional patent application Ser. No. 15680146 filed on Aug. 17, 2017; and entitled DETERMINING A COMMUNICATION LANGUAGE FOR INTERNET OF THINGS DEVICES. Nonprovisional patent application Ser. No. 15703718 filed on Jun. 5, 2017; and entitled AUTONOMOUS AND REMOTE PAIRING OF INTERNET OF THINGS DEVICES UTILIZING A CLOUD SERVICE II. Nonprovisional patent application Ser. No. 1818275 filed on Nov. 20, 2017; and entitled AUTOMATED SMART DOORBELL DEVICE AND METHOD. Nonprovisional patent application Ser. No. 15835985 filed on Dec. 8, 2017; and entitled AUTONOMOUS AND REMOTE PAIRING OF INTERNET OF THINGS DEVICES UTILIZING A CLOUD SERVICE. Nonprovisional patent application Ser. No. 15888425 filed on Feb. 5, 2018; and entitled SMART PANEL DEVICE AND METHOD. Nonprovisional patent application Ser. No. 15888425 filed on Feb. 5, 2018; and entitled SMART PANEL DEVICE AND METHOD. Nonprovisional patent application Ser. No. 15944696 filed on Apr. 3, 2018; and entitled SMART TRACKER DEVICE AND METHOD. Nonprovisional patent application Ser. No. 16056276 filed on Aug. 6, 2018; and entitled SMART CAM DEVICE AND METHOD. Nonprovisional patent application Ser. No. 16219626 filed on Dec. 13, 2018; and entitled SYSTEM AND METHOD FOR CONNECTING A NETWORK CAMERA. Nonprovisional patent application Ser. No. 16372053 filed on Apr. 1, 2019; and entitled SMART ACTIVE CAMERA DEVICE AND METHOD. Nonprovisional patent application Ser. No. 16418998 filed on May 21, 2019; and entitled ACCESS VERIFICATION DEVICE AND METHOD.

FIELD

The present disclosure generally relates to an electronic device, and more particularly, to an electronic lock for facilitating video telephony, identifying a user, and authorizing user access at a moveable barrier.

BACKGROUND

With the increasing popularity of smart devices and advanced mobile device verification using fingerprint or face recognition. In recent years, consumers have become more comfortable providing biometric information to a mobile device to verify their identity to a service provider. Subsequently, service providers have opted to request advanced mobile device verification from users to simplify account access and improve online transactions or rapidly connect users to an ecommerce site. Once a user verifies their identity using their account credentials, they may opt to use advanced mobile verification for future access.

Following widespread consumer acceptance of advance mobile verification, various identity verification services have proliferated offering diverse custom solutions for verifying access to various everyday services, for example, accessing a facility, office, vehicle, mailbox, payment processing and verification, or other smart device access and operation. Advanced mobile verification enables users to quickly connect to a service, facility, or device without resorting to a username, password, date of birth, or other personally verifiable information.

While advanced mobile verification methods help mitigate unauthorized account access, many existing smart devices, public facilities, ecommerce sites, and shops lack implementation of advanced verification. Moreover, users are required to carry and operate their mobile devices to provide user authentication. And while advanced mobile verification can verify user account credentials and access, many online services offer account access using account credentials taken from a social media account, an email account, or various other online platforms or apps that may/could be compromised. Consequently, there is a need for a platform to interconnect verified entities and users with verified devices using multiple identification factors.

SUMMARY

The disclosed subject matter relates to a smart lock and method. The smart lock may be used as an interior or exterior smart lock device. The smart lock device comprising at least one memory, one or more sensors, for acquiring one or more verification parameters, a visual information, or an audio information from a surrounding environment of a current user, a processor, coupled to the at least one memory, the processor configured to receive, from the one or more sensors, a first verification parameter from the current user, wherein the first verification parameter includes biometric information from the current user, and wherein the processor is configured to cause: a first action upon detecting the current user at a first predetermined distance within a first geographical zone, wherein the first action comprises of collecting a visual information, or an audio information from the surrounding environment, and a second action upon detecting the current user at a second predetermined distance within a second geographical zone, wherein the second action comprises of acquiring the first verification parameter from the current user.

The disclosed subject matter further relates to a method comprising detecting, by a smart lock device, a current user at a first predetermined distance within a first geographical zone and responsive to the detecting performing a first action; wherein the first action comprises of acquiring at least one of a visual information, an audio information, or both from a surrounding environment of the current user, wherein the first action continues acquiring the visual information, the audio information, or both from the surrounding environment when the current user is at a second predetermined distance within a second geographical zone; detecting, by the smart lock device, the current user at a second predetermined distance within a second geographical zone and responsive to the detecting performing a second action; wherein the first geographical zone is defined from a first distance from the smart lock device or a physical door and the second geographical zone is defined from a second distance from the smart lock device or a physical door and wherein the second geographical zone overlaps the first geographical zone; and acquiring at one or more verification parameters from the surrounding environment of the current user.

The disclosed subject matter further relates to a non-transitory machine-readable medium comprising instructions stored therein, which, when executed by one or more processors of a processing system cause the one or more processors to perform operations comprising: detecting, by a smart lock device, a current user at a first predetermined distance within a first geographical zone and responsive to the detecting performing a first action; wherein the first action comprises of acquiring at least one of a visual information, an audio information, or both from a surrounding environment of the current user, wherein the first action continues acquiring the visual information, the audio information, or both from the surrounding environment when the current user is at a second predetermined distance within a second geographical zone; detecting, by the smart lock device, the current user at a second predetermined distance within a second geographical zone and responsive to the detecting performing a second action; wherein the first geographical zone is defined from a first distance from the smart lock device or a physical door and the second geographical zone is defined from a second distance from the smart lock device or a physical door and wherein the second geographical zone overlaps the first geographical zone; and acquiring at one or more verification parameters from the surrounding environment of the current user.

It is understood that other configurations of the present disclosure will become readily apparent to those skilled in the art from the following detailed description, wherein various configurations of the present disclosure are shown and described by way of illustration. As will be realized, the present disclosure of other different configurations and its several details are capable of modifications in various other respects, all without departing from the subject technology. Accordingly, the drawings and the detailed description are to be regarded as illustrative in nature and not restrictive.

BRIEF DESCRIPTION OF THE DRAWINGS

Certain features of the present disclosure are set forth in the appended claims. However, for purpose of explanation, several implementations of the present disclosure are set forth in the following figures.

FIGS. 1A-1E illustrates an exemplary exterior electronic lock system in accordance with one or more exemplary embodiments of the present disclosure.

FIGS. 2A-2D illustrates an exemplary interior electronic lock system in accordance with one or more exemplary embodiments of the present disclosure.

Figure 3:
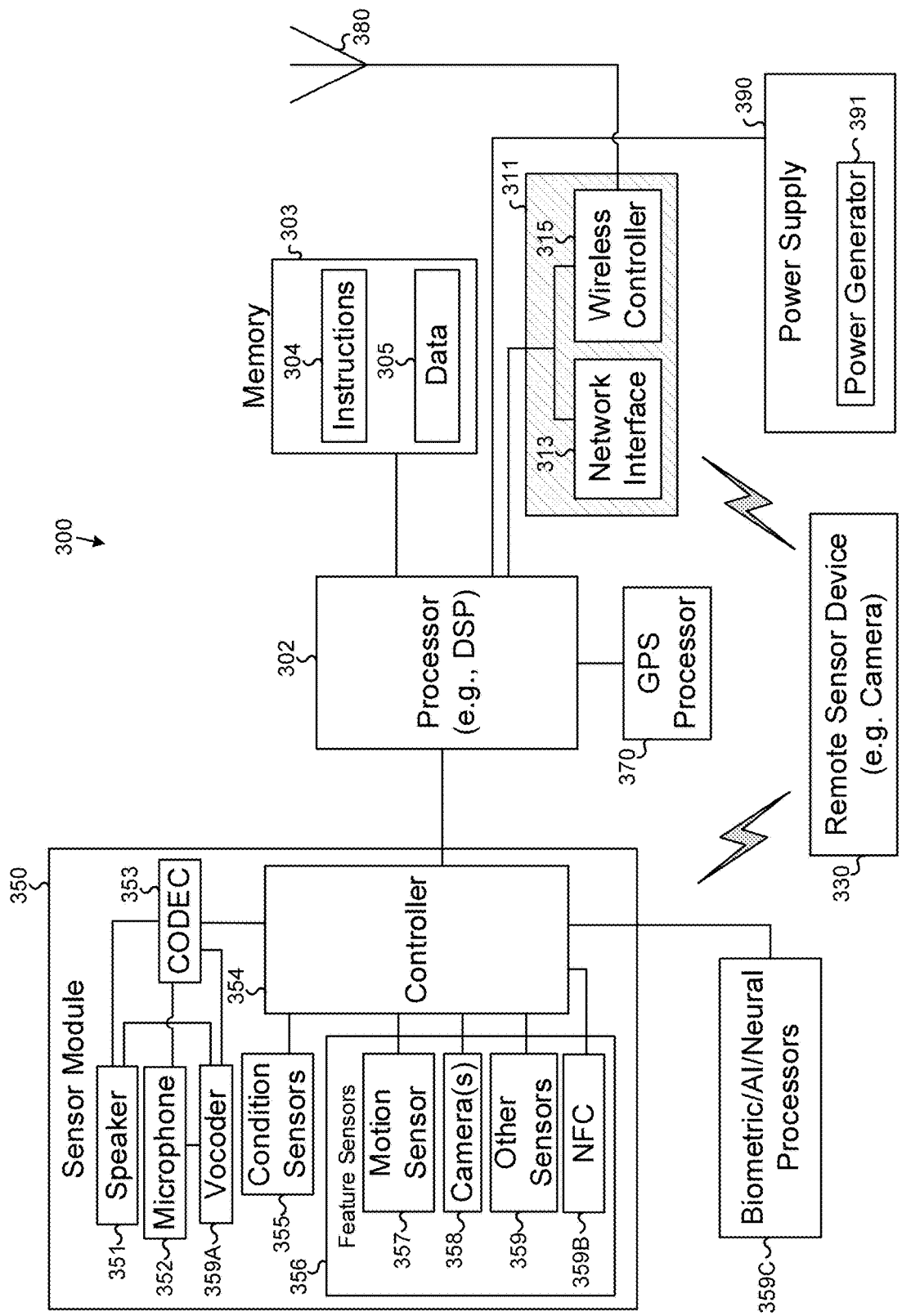
FIG. 3 illustrates an exemplary embodiment of the internal components of the electronic lock system in accordance with one or more exemplary embodiments of the present disclosure.

Embodiments of the present disclosure and their advantages are best understood by referring to the detailed description that follows. It should be appreciated that like-reference-numerals are used to identify like-elements illustrated in one or more of the figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to better illustrate details and features of the present disclosure.

Various features of the present disclosure will now be described and is not intended to be limited to the embodiments shown herein. Modifications to these features and embodiments will be readily apparent to those skilled in the art, and the principles defined herein may be applied to other embodiments without departing from the scope of the disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Referring to FIGS. 1A-1B an exemplary exterior electronic lock system 100*a* with verification components 110 flush to, or underneath, the exterior surfaces of the electronic lock system 100*a* of the present disclosure is illustrated. Referring to FIGS. 1C-1D an exemplary exterior electronic lock system 100*b* with one or more with verification components 110 as protruding surfaces of the present disclosure is illustrated. The protruding verification components 110 (trim plate 103, door collar 101, cylinder 109, door handle 107, and inner door handle 105) of the exemplary electronic lock system 100*b* may provide better visibility for user interaction, better detection of environmental conditions, environmental features, and biometric information.

Referring to FIGS. 1A-1E, the exemplary exterior electronic lock system 100*b*, 100*a*, and 100*a*2 (hereinafter "electronic lock system 100") may include a trim plate 103, door collar 101, cylinder 109, door handle 107, and inner door handle 105. The exemplary electronic lock system 100 may include a fastener, the fastener may be a latch, a deadbolt, a bar, a spring, or the like. The exemplary electronic lock system 100 may include a dual locking system, or dual locking fasteners, comprising one or more latches 113 for holding the moveable barrier 117 in a closed position, and latch bolt 111 for securing and locking the moveable barrier 117 to a post, frame, or casing (not shown). The latches 113 and latch bolt 111 may each lock individually to secure moveable barrier 117 to a post, frame, casing, masonry, or the like. Latch bolt 111 and latches 113 of electronic lock system 100 may be configured to mechanically and/or electrically operate to hold moveable barrier 117 to a post, frame, or casing (not shown). Latch bolt 111 and latches 113 may be operated by either the exterior electronic lock system 100 or interior electronic lock system 200. The moveable barrier 117 includes an exterior surface 117*a* for positioning exterior electronic lock system 100 and an interior surface 117*b* for positioning interior electronic lock system 200 as shown in FIGS. 2A-2B.

The trim plate 103, door collar 101, cylinder 109, door handle 107, or inner door handle 105 of the exemplary electronic lock system 100 may include one or more touch and non-touch sensors (e.g. camera) to serve as verification components 110, and one or more touch or non-touch interactive panels or displays for providing a user interface to display the status of the electronic lock system 100, the status of the user, and to present the user with options or a greeting to interact with other users. One or more verification components 110 may be used to verify users and provide a user interface for communicating with other electronic devices 541, external sensors (e.g. embeddable, implantable, and ingestible sensors, chemical or biosensors, and wearable sensors), and/or users. Each verification component 110 may include touch screens, mechanical switches, touch sensitive switches, displays, graphical and/or touch interfaces, virtual assistant (e.g. a voice operable AI device), sensors, cameras, receivers, transmitters, etc.

The trim plate 103 may include one or more sensors to detect and collect information about environmental conditions, for example, motion sensors, environment sensors, cameras, as well as other sensors to detect temperature, humidity, precipitation, air quality, etc. The trim plate 103 may include, for example, temperature sensor, ambient light sensor, humidity sensor, barometer sensor, air quality sensor (e.g. for detecting allergens, gas, pollution, pollen, etc.), infrared sensor, $CO_2$ sensor, CO sensor, piezoelectric sensor, airflow or airspeed sensor, and the like.

The door collar 101, cylinder 109, and inner door handle 105 may include one or more sensor modules 350 to detect and collect biometric information through touch and non-touch interactions, for example, fingerprint, retinal features, facial and image recognition, palm features, handprint, and other personally identifiable information for example, speech and audible information, body size, color, shape, posture, and the like. As mentioned above, one or more external sensors may interact with door collar 101, for example, voltaic cells, glucose-monitoring sensors, embeddable, implantable, and ingestible sensors, chemical or biosensors, and wearable sensors.

The environmental conditions may be collected by environmental sensors 356 may be used by the processor 302 of the module 301 in determining whether to notify a user (e.g. by wireless user device 532) or operate the electronic lock system 100. Environmental sensors 356 may include, for example, a motion sensor, camera, and other sensors (e.g. proximity sensor, occupancy sensor, ambient light sensor). A microphone 352 may also be used to detect features or verify the opening or closing of entry door, or presence of animals, vehicle, or individuals, or any type of environmental activity around a building.

The cylinder 109 may include a mechanical push button or switch, a display (not shown), and a touch sensitive (e.g. resistive, capacitive, optical, surface acoustic wave (SAW), ultrasonic, etc.,) touchpad for detecting fingerprints, finger presses, finger taps, or finger swipes. The electronic lock system 100 may operate, for example, electronic devices 541 based on detected motion, sound (e.g. voice signature), video (e.g. facial recognition), fingerprints, finger presses, finger taps, or finger swipes, or any combination thereof detected by the one or more verification components 110.

As shown in FIG. 1E, the verification components 110 of the exemplary electronic lock system 100 may include other designs for door handle 107 or cylinder 109 to facilitate better detection of biometric information (palm features, fingerprint features, etc.,), image and facial recognition, environmental conditions and features. For example, the exemplary electronic lock system 100*a*2 may include a trim plate 103, door collar 101, cylinder 109, door handle 107, and inner door handle 105.

The electronic lock system 100 may include a night LED formed on door collar 101, cylinder 109, or door handle 107 to provide better lighting conditions for collecting biometric information, video footage, or to provide a convenient night light function in the entryway.

As shown in FIG. 1B and FIG. 1D, the exemplary electronic lock system 100 include a latch strike 115 for aligning latches 113 and latch bolt 111 and securing the electronic lock system 100 to a moveable barrier 117. As shown in FIG. 2B, latches 113 and latch bolt 111 of the electronic lock system 100 are received by frame reinforcer assembly 218 and cavity 219.

Referring to FIGS. 2A-2B, the exemplary interior electronic lock system 200 includes housing 231, cylinder housing 235, power supply housing 233, and connections housing 241. The cylinder housing 235 may include handle 261 and one or more touch and non-touch interactive panels 251. The handle 261 couples to and operates latch bolt 211 and latches 213. The power supply housing 233 or door collar 101 may house one or more disposable batteries or rechargeable batteries, for example, nickel cadmium (NiCd), lithium (Li), AA, AAA, and/or rechargeable capacitors, for example, supercapacitors (SC) or ultracapacitors to supply power to interior electronic lock system 200, exterior electronic lock system 100, or both. The connections housing 241 may house one or more digital or analog connection ports 243. The connection port 243 may connect to an outlet 227 using a power adapter. The connections housing 241 may include reset/power button 245 for resetting device or network settings of interior electronic lock system 200 or exterior electronic lock system 100.

Exterior electronic lock system 100 and interior electronic lock system 200 may be electrically and communicable coupled to each other through cylinder housing 235. The connection port 243 may supply power to charge the rechargeable batteries of power supply housing 233. The connection port 243 may provide power to electronic lock system 100 and electronic lock system 200. In some exemplary embodiments, the interior electronic lock system 200 and exterior electronic lock system 100 may charge through a frame reinforcer assembly 218.

As shown in FIGS. 2B-2C, the frame reinforcer assembly 218 includes latch contacts 221, connector 223, and power adapter 225 for connecting to a power outlet 227. The frame reinforcer assembly 218 may be installed on a panel 216 (e.g. post, frame, casing, etc.,) and positioned over a cavity 219 in the panel 216. In some exemplary embodiments, frame reinforcer assembly 218 may include a housing 220.

The housing 220 is inserted into cavity 219 and receives latches 213 and latch bolt 211.

In some exemplary embodiments, frame reinforcer assembly 218 may include a housing 220. When a housing 220 is included latch contacts 221 and connector 223 may be formed within the housing 220 instead of being installed into cavity 219. While in other exemplary embodiments, latch contacts 221 may include mounting screws for being installed separately in cavity 219 of panel 216. Thus, latch contacts 221 may be installed separately in cavity 219 of panel 216 as shown in FIG. 2B or may be formed inside housing 220 of frame reinforcer assembly 218 and placed in a cavity 219 of panel 216 as shown in FIG. 2C.

Latch contacts 221 may provide touch contact or inductive charging or metal contact charging to charge rechargeable batteries and/or rechargeable capacitors of interior electronic lock system 200 and exterior electronic lock system 100. Upon positioning door 217 in a closed position (i.e. door 217 being aligned with panel 216), latches 213 extend outwards into cavity 219 and contact latch contacts 221. The latches 213 may be configured to include electrical leads to electrically couple the power supply of interior electronic lock system 200 and exterior electronic lock system 100 to the power outlet 227 through latch contacts 221. Further, the exemplary latch contacts 221 may be configured to include electrical leads to couple latches 213 of FIGS. 2B-2C to power outlet 227. Thus, rechargeable batteries and/or rechargeable capacitors of interior electronic lock system 200 and/or exterior electronic lock system 100 may charge directly through latch contacts 221. The interior electronic lock system 200, exterior electronic lock system 100, and frame reinforcer assembly 218 may include a wireless charging chipset, thermal protection sensor, and foreign object detection circuit to prevent conductive materials from receiving power through electrical leads of latch contacts 221 and latches 213.

The interior electronic lock system 200 and exterior electronic lock system 100 may charge indirectly through wireless charging bridge 290. The wireless charging bridge 290 may include a status LED indicator 292 and power/reset button 294. The wireless charging bridge 290 may include a wireless charging chipset, thermal protection sensor, and foreign object detection circuit to prevent conductive materials from receiving power from the wireless charging bridge 290.

The connection ports 243 and power adapter 225 may use any common interface that enables communication between electronic devices and provides support for electrical power, for example, a Universal Serial Bus (USB) interface. In some exemplary embodiments, connection ports 243 and power adapter 225 may use an interface that does not have a data connection and are used only as a power connection (e.g. USB type B connectors).

The cylinder housing 235 and one or more touch and non-touch interactive panels 251 may be configured to include one or more touch and non-touch sensors (e.g. camera) to serve as verification components 210, and one or more touch or non-touch interactive panels or displays for providing a user interface to display the status of the electronic lock system 200, the status of the user, and to present the user with options or a greeting to interact with other users. One or more verification components 210 may be used to verify users and provide a user interface for communicating with other electronic devices 541, external sensors (e.g. embeddable, implantable, and ingestible sensors, chemical or biosensors, and wearable sensors), and/or users. Each verification component 210 may include touch screens, mechanical switches, touch sensitive switches, displays, graphical and/or touch interfaces, virtual assistant (e.g. a voice operable AI device), sensors, cameras, receivers, transmitters, etc.

FIG. 3 illustrates an exemplary embodiment of some internal components that may be used for the exemplary electronic lock system 300 of the present disclosure. In some exemplary embodiments, the interior lock system 200 and the exterior lock system 100 may separately include the components of the electronic lock system 300. In other exemplary embodiments, the tasks of verification and user interaction may be performed by the exterior lock system 100 while the action (e.g. opening lock) and charging are performed by the interior lock system 200. Still in other exemplary embodiments, the exterior lock system 100 may perform, in part or in whole, verification, action, user interaction, and charging through the frame reinforcer assembly 218. In other exemplary embodiments, the electronic lock system 300 may refer to the interior lock system 200, the interior lock system 200 may add or share hardware and communication capabilities with exterior lock system 100. Therefore, the exemplary electronic lock system 300 may refer to either the interior lock system 200 or the exterior lock system 100.

Therefore, the electronic lock system 300 may include sensor module 350 to collect authentication factors, and/or appropriate hardware and communication capabilities for processing collected user interactions, inputs, authentication factors, battery charging, and communicating to exterior electronic lock system 100 or the interior electronic lock system 200 to perform one or more messaging, text, video, or an action (e.g. unlock/lock). It should be appreciated that the disclosed subject matter may be implemented using essentially any remote computing device 531 having appropriate hardware and communication capabilities for collecting user interactions or inputs.

The electronic lock system 300 may include any computing device having various touch and non-touch input devices for authenticating an individual 480 (e.g. using biometric sensing capability) and performing an action based on user interaction and authentication factors used to authenticate the individual 480. For purposes of this discussion, user interactions with exterior electronic lock system 100 and interior electronic lock system 200 may be referred to for collecting authentication factors of individual 480. Individual 480 interactions may include touch and non-touch interactions, for example, fingerprint, retinal scan, facial and image recognition, other biometric information, audible information, body size, color, and shape, posture, and the like. Various entity interactions, authentication factors, and authentication processes are described in more detail in the cross-referenced patent application entitled "Access Verification Device and Method" incorporated by reference.

The exemplary electronic lock system 300 may be any sort of electronic device that transmits signals over a network, such as electronic devices embedded in smart appliances, vehicles, electronic devices, and other smart systems. The exemplary electronic lock system 300 may include various types of computer readable media (e.g., a non-transitory computer-readable medium) and interfaces for various other types of computer readable media. The exemplary electronic lock system 300 may include one or more cameras 358 and may be communicably coupled to one or more remote sensor devices 330. The remote sensor devices 330 may contain, in part or in whole, components of sensor modules 350 and to facilitate collection of authentication factors of one or more individual 480. The electronic lock system 300 may comprise of an electronic device having a processor, memory, network interface, GPS, power supply, etc., communicably coupled to one or more sensors, for example, remote sensor devices 330 or sensor modules 350.

The exemplary electronic lock system 300 includes a processor 302 and memory/storage 303. The processor 302 may retrieve and execute instructions 304 and/or data 305 from memory/storage 303 to perform the processes of the present disclosure. Processor 302 may be a single processor, a multi-core processor, or multiple processors in different implementations.

Figure 6:
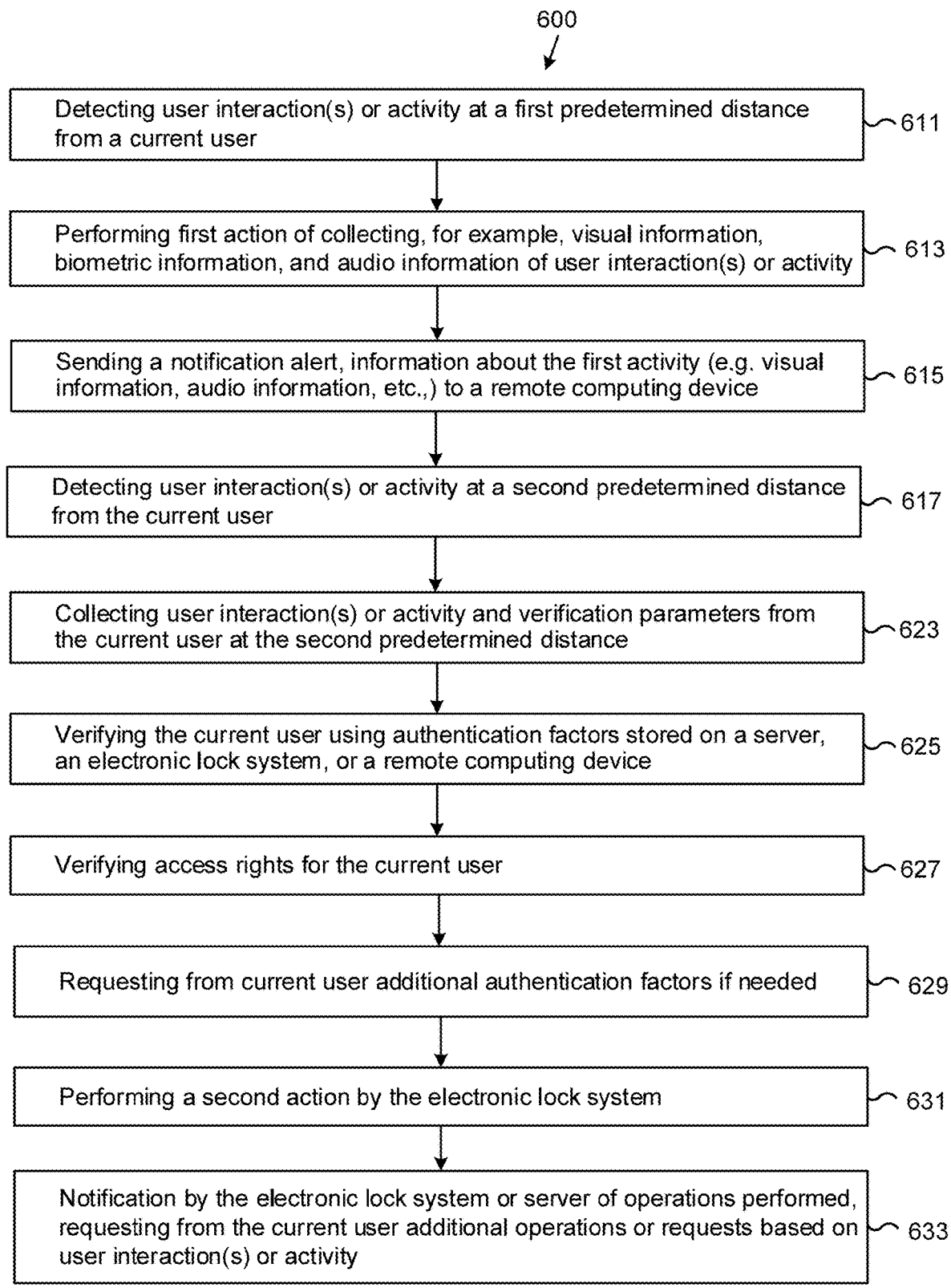
FIG. 6 illustrates an exemplary embodiment of a flowchart of interactions and operations of the electronic lock system in accordance with one or more exemplary embodiments of the present disclosure.

Instructions and data for operating electronic lock system 300 may be stored on, transmitted from, or received by any computer-readable storage medium (e.g., memory/storage of remote sensor devices 330, remote computing device 531) storing data (e.g., data 305) that is accessible to a processor (e.g., the processor of remote sensor devices 330, remote computing device 531) during modes of operation of the electronic lock system 300. The electronic lock system 300 may access and execute instructions 304 and/or data 305 stored on any remote computing device (e.g. remote sensor devices 330). The data 305 may be a method instruction as depicted in FIG. 6. The method instructions are executable by processor 302, where the instructions include steps on how to remotely operate and configure one or more remote sensor devices 330, or remote computing device 531.

The memory/storage 303 may include a dynamic random-access memory (DRAM) and/or a read-only memory (ROM). Memory/storage 303 may provide a temporary location to store data 305 and instructions 304 retrieved and processed by processor 302. Memory/storage 303 may include a non-volatile read-and-write memory that stores data 305 and instructions 304, even when Wi-Fi/Internet is off, that may be retrieved and processed by processor 302. For example, memory/storage 303 may include magnetic, solid state and/or optical media, memory/storage 303 may be a single or multiple memory units as necessary. The memory/storage 303 stores all collected authentication factors and environmental conditions (e.g. visual, audio, textual, voice, motion, heat, temperature, humidity, air quality, proximity, etc.) provided directly from the electronic lock system 300 or the one or more remote sensor devices 330, or indirectly through a wireless connection to another electronic device(s), sensor(s), or sensor module(s) 350 (e.g. another remote computing device 531 comprised of one or more sensors).

The exemplary electronic lock system 300 couples to a network through a network interface 313. In some aspects, network interface 313 is a machine-interface. In this manner, the electronic lock system 300 may be a part of a network of computers, a local area network (LAN), a wide area network (WAN), or an Intranet, or a network of networks, for example, the Internet. A wireless controller 315 may be coupled to the processor 302. The wireless controller 315 may be further coupled to an antenna 380. The network module 311 may be integrated as system-in-package or system-on-chip device and/or collectively defined as having the network interface 313 and wireless controller 315. Network interface 313 and wireless controller 315 integrated into the network module 311 and being coupled to an antenna 380. Any or all components of electronic lock system 300 may be used in conjunction with the subject disclosure. The network interface 313 may include cellular interfaces, WiFi™ interfaces, Infrared interfaces, RFD interfaces, ZigBee interfaces, Near-Field Communication (NFC), Bluetooth interfaces, Ethernet interfaces, coaxial interfaces, optical interfaces, radio communication interfaces, or generally any communication interface that may be used for device communication.

A sensor module 350 may be communicably coupled to the exemplary electronic lock system 300. The sensor module 350 may be coupled to electronic lock system 300, formed on electronic lock system 300, or remotely connected to electronic lock system 300. The sensor module 350 may include and control various sensor components for sensing authentication factors and environmental conditions (e.g. temperature, humidity, air quality, smoke, CO, $CO_2$, etc.). Sensor components may monitor environmental conditions and appropriately adjust sensors to collect authentication factors, for example, facial recognition, body and color, etc., by using one or more condition sensors 355, motion sensors 357, cameras 358, and other sensors 359 (e.g. heat, occupancy, lighting, ambient lighting, etc.). Motion sensors 357 may include, for example, orientation, velocity, acceleration, heading, direction, or axis of the electronic lock system 300.

The electronic lock system 300 may collect additional authentication factors from one or more remote sensor devices 330. The sensor modules 350, electronic lock system 300, and remote sensor devices 330 may collect media or media information which may be defined as including, for example, interior and exterior environmental conditions, visual, spatial, and audio information, infrared, near-infrared, ultrasonic, radio frequency, and microwave signals, etc. The level of detail or number of authentication factors required may be configured, preset, or preselected by user preference, or user behavior or user patterns determined by electronic lock system 300. The electronic lock system 300 may collect additional authentication factors based on the capabilities of the electronic device 541, remote sensor device 330, or remote computing device 531, or based on daily, weekly, or monthly history of user behavior and user interactions as stored on the electronic lock system 300, remote computing device 531, electronic device 541, or remote sensor device 330.

A combination of sensor components may be implemented to provide comprehensive collection of authentication factors, user interactions, video and audio monitoring, and improved accuracy in environmental monitoring to account for interior and exterior environmental conditions which may introduce aberrations, artifacts, or anomalies. Moreover, individual sensor components from sensor module 350 may be separately coupled to electronic lock system 300, formed on electronic lock system 300, or remotely connected to electronic lock system 300. In some exemplary embodiments, some sensor components may be grouped together to form a second or additional sensor modules. In certain embodiments, some sensor components of sensor module 350 (e.g. motion sensor 357) may instead be formed on the electronic lock system 300. Further, in some embodiments, some sensor components of sensor module 350 (e.g. infrared sensor, other sensors 359) may also be formed on the electronic lock system 300 to provide additional or supplemental monitoring.

Referring to FIGS. 1A-1E, FIGS. 2A-2C, FIGS. 4A-4D, and FIG. 5, data collected from sensor components ("sensory data") of electronic lock system 300 may be used together with sensory data from the one or more cameras 358 and/or the one or more remote sensor devices 330 (e.g. remote computing device 531 or electronic device 541) for collecting and substantiating authentication factors and user interactions (e.g. selecting an alternative camera for collecting hair, skin tone, and body dimensions of individual 480).

The electronic lock system 300 may collect additional authentication factors based on prior user interactions with remote computing device 531 or electronic device 541. Moreover, user interactions from individual 480 may provide authentication factors to one or more sensor modules 350 or electronic lock system 300 for verifying, creating, deleting, or updating an entity profile, one or more rule sets, or one or more rule lists. In some exemplary embodiments, individual 480 may provide additional authentication factors to one or more sensor modules 350 or electronic lock system 300.

In the event the electronic lock system 300 lacks adequately collected authentication factors (e.g. biometric information), the electronic lock system 300 may use previously collected sensory data from individual 480, and prior stored user interactions to determine whether one or more secondary authentication factors (e.g. height, body size, color, clothes, etc.,) may be substituted for primary authentication factors (e.g. fingerprint, facial recognition). Then, upon verification of one or more secondary authentication factors of individual 480, electronic lock system 300 may provide access, operate, send notifications, or complete a request. For example, individual 480 may attempt to operate exterior electronic lock system 100 to open or close using biometric information, for example, facial recognition. The facial recognition verification on exterior electronic lock system 100 or interior electronic lock system 200 may fail to process within a predetermined amount of time due to various factors or limitations, for example, the individual's 480 distance from the electronic lock system 300, environmental factors such as ambient lighting, and software, power, or hardware limitations of electronic lock system 300. In some exemplary embodiments, the owner of electronic lock system 300 may desire additional authentication factors based on these limitations. The individual 480 may provide primary authentication factors to electronic lock system 300, using, for example, remote computing device 531 user interactions history or one or more remote sensor device 330 having suitable software, power, or hardware to provide primary authentication factors.

The current individual 480 location and validated user interactions history may be used by the electronic lock system 300 to learn or predict user behavior. Remote computing devices 531 and electronic device 541 may be communicably coupled to the electronic lock system 300 to send or receive authentication factors for an individual 480. The electronic lock system 300 may use learned or predicted user behavior to relay authentication factors to other electronic devices 541. The electronic lock system 300 may relay individual 480 authentication factors, for example, physical address and personal information, real ID identity verification, as well as providing recent information on criminal activities to other electronic lock system 300 to inhibit or prevent further crime, damage, or negligent behavior. The electronic lock system 300 may take such collected sensory information and prioritize actions (e.g. device operations), or complete requests based on entity location and validated user interactions history and learned or predicted user behavior.

Condition sensors 355 may detect and collect information about environmental conditions within a predetermined distance from the individual 480. Condition sensors 355 may include but not be limited to, for example, temperature sensor, ambient light sensor, humidity sensor, barometer sensor, air quality sensor (e.g. for detecting allergens, gas, pollution, pollen, etc.), infrared sensor, $CO_2$ sensor, CO sensor, piezoelectric sensor, airflow or airspeed sensor. The sensor components 355-359, etc., may be used by the processor 302 of the electronic lock system 300 to determine how to operate or when to access remote sensor devices 330.

Other sensors 359 may detect and collect information about environmental features within a predetermined distance from the individual 480. Other sensors 359 may include, for example, a proximity sensor, occupancy sensor, ambient light sensor. Other sensors 359 may include additional sensors for facilitating biometric information collection of individual 480, for example, voltaic cells, glucose-monitoring sensors, embeddable, implantable, and ingestible sensors, chemical or biosensors, and wearable sensors.

Microphone 352 and speaker 351 may be used to collect user interactions and an audible verification parameter from individual 480. For example, individual 470 may make audible requests to electronic lock system 300, for example, to operate the lock or view individual 480 as seen by exterior electronic lock 100.

The user may define or select specific authentication factors (e.g. fingerprint verification, facial verification, etc.,) for operating electronic lock system 300. The user may then define a default action (e.g. default lock operations) for non-verified users, actions for verified users, actions based on schedule or time of day, and actions based on type of individual 480 detected (e.g. a delivery person, a child, an elder, etc.,). A user may define different authentication factors for electronic lock system 300 actions, for example, playing a greeting or message to non-verified users, operating the electronic lock system 300 to open after verifying biometric information of an authorized individual 480, or initiating a video teleconference call upon detecting an individual 480 during specific hours of the day (e.g. at noon or upon detecting a delivery person). The electronic lock system 300 may store biometric information of verified individuals 480 and user interactions in a database, the electronic lock system 300 may retrieve a list of available actions for each verified individual 480.

The electronic lock system 300 may use physical location of the individual 480 as determined by methods such as GPS data, identification of the nearest cell tower, code transmitted by a Bluetooth beacon or WiFi™ access point, for example, as determined and sent from the electronic devices of individual 480 during user interactions and collection of authentication factors. The electronic devices of individual 480 may obtain location information by other means, for example, short range wireless communication and near field communication (NFC) for collecting user interactions and authentication factors for transaction processing.

The sensor module 350 or remote sensor device 330 may include short range wireless communication interfaces, including an NFC module 359B, to establish radio communication with other such devices in close proximity (e.g. electronic device 541, remote computing device 531). In some exemplary embodiments, electronic lock system 300 may include short range wireless communication interfaces such as an NFC. Due to its short range and support for encryption, NFC communication is suitable for secure communication over short distances. The NFC module 359B may include a transceiver, an antenna, and an NFC sensor configured to communicate with other NFC capable devices. The NFC module 359B provides two-way wireless communication of information in accordance with NFC technology and protocols for transmitting and receiving NFC communications to/from other NFC compatible devices over short air link distances. User interactions may send and receive a variety of signaling messages for establishing NFC links with other NFC-enabled devices to send authentication factors over the established NFC links. The signaling, may establish a user interaction from an individual 480 to establish an NFC link to send and/or receive data for verifying an individual 480.

The sensor module 350 or remote sensor device 330 may further include voice communication or voice recognition as a verification parameter. The microphone 352 and speaker 351 may be communicatively coupled to a voice or audio encoder/decoder (vocoder) 359A. The vocoder 359A provides two-way conversion between analog audio signals representing speech or other audio and digital samples at a compressed bit rate compatible with the digital protocol of wireless telephone network communications or voice over packet (e.g., Internet Protocol) communications. The vocoder 359A may be used as additional authentication factors for individual 480. Collected voice communication may be processed by vocoder 359A, compressed at codec 353, and sent to controller 354 for processing voice communication into voice samples.

The processor 302 may retrieve and execute instructions 304 and/or data 305 from memory/storage 303 to compare voices samples with voice recognition samples or data. Upon verification of individual 480 through voice recognition samples the processor 302 may instruct the electronic lock system 300 to perform an action (e.g. open aggregate server 150 may then process the entity request. Moreover, the vocoder 359A may be used as a user interaction interface to collect speech input information from individual 480 and provide user prompts, notifications, warnings, messages, etc., based on the type of user (e.g. unknown user, verified users, guest, etc.,) and the type of user interaction (e.g. deliver message, deliver mail, operate lock, etc.,). Audible prompts may be output via the speaker 351. The microphone 352 and vocoder 359A may be used for voice input and voice communication verification parameter in addition to one or more authentication factors collected by the sensor module 350 or remote sensor device 330.

The sensor module 350 includes a controller 354 for controlling sensors 355-359B and processing data collected by the sensors. Controller 354 may include a processor, memory/storage device (storing sensor instructions, settings, etc.), and a network module wireless chip for directly communicating with one or more remote sensor devices 330 connected to the network. Controller 354 may send measured/detected environmental conditions from remote sensor device 330 and cameras 358 to processor 302 for further processing. Alternatively, processor 302 may send measured/detected environmental conditions from one or more remote sensor devices 330 to controller 354 for further processing, or processor 302 may allocate or share processing power of sensory data with controller 354. Controller 354 may then send control commands to processor 302, or directly to remote sensor devices 330, to operate or access one or more remote sensor devices 330.

One or more cameras 358 of electronic lock system 300 may also collect user interactions, authentication factors, biometric information, and visual information such as video and still images of the surrounding environment of individual 480. The one or more cameras 358 may be coupled to controller 354 for determining how to operate one or more remote sensor devices 330 to capture visual information, user interaction, or authentication factors from individual 480 that may be sent to the processor 302. The controller 354 may be coupled to the processor 302 for processing visual information. The processor 302 may provide visual information captured from camera 358 to any electronic device which may facilitate interaction or communication with a person or an object positioned within a vicinity of the electronic lock system 300. The camera 358 may be any optical instrument for recording or capturing images that may be stored locally, transmitted to another location, or both. The images may be still photographs, or sequences of images forming videos or movies. The camera 358 may be any type of camera, for example, high-end professional camera type, digital camera, panoramic camera, fish-eye lens type camera, multi-lens type camera, VR camera, etc. The camera 358 may collect visual information, for example, facial features, palm features, fingerprint, handprint, retinal features, and other personally identifiable information for biometric, visual, and genomic information of an individual 480.

The sensor module 350 may be powered by a power supply 390. The power from the power supply 390 may be provided by disposable batteries or rechargeable batteries, for example, nickel cadmium (NiCd), lithium (Li), AA, AAA, and/or rechargeable capacitors, for example, supercapacitors (SC) or ultracapacitors. The power supply 390 may supply power to sensor module 350 by, for example, a power adapter for connecting to an outlet, a solar panels/cell, or any other renewable/alternative power supply source. The sensor module 350 may use multiple battery types, for example, using a coin cell battery to operate some sensor components or to provide auxiliary power.

The sensor module 350 may include a speaker 351 and microphone 352 for communicating with a user or receiving control commands from a user positioned within a vicinity of the electronic lock system 300. The speaker 351 and microphone 352 may be coupled to a CODEC 353. The coder/decoder (CODEC) 353 may also be coupled to the vocoder 359A for compressing speech input or voice communications. The coder/decoder (CODEC) 353 may also be coupled to the processor 302 through a controller 354. The processor 302 may provide audio information captured from the microphone 352 to any electronic device (e.g. remote sensor devices 330), that may facilitate communication with an individual 480 positioned within a vicinity of one or more remote sensor devices 330.

In an exemplary embodiment, the electronic lock system 300 and/or sensor module 350 comprises at least one motion sensor 357 for detecting motion information. For example, motion sensor 357 may detect moving objects, pets, and/or pedestrians. The motion sensor 357 may be a passive infrared motion detector. Infrared motion sensors are also known as PIR (passive infrared) motion sensors or simply PIR sensors. Such detectors have about a 120° arc and about a 50-foot range detection zone. In the case where an increased field of view of motion detection or more accurate motion detection is required, two or more motion detectors may be used.

Suitable alternate motion detectors may also be used, such as ultrasonic, optical, microwave, or video motion detectors. Additional alternative types of motion detectors may also be used to sense intrusion including laser scanning or frequency sensitive detectors, commonly referred to as "glass breaks", Motion sensor 357 may include image sensors having any type of low light level imaging sensors used for surveillance and unmanned monitoring in daylight to complete darkness, for example, low-light complementary metal-oxide-semiconductor (CMOS) or charge-coupled device (CCD) image sensors.

The motion sensor 357 may also be complemented with other devices to aid in detecting motion such as, for example, photocell sensors, cadmium-sulfide (CdS) cells, light-dependent resistors (LDR), and photoresistors. In addition to motion sensors, the photo cell sensors may be used to determine if there something in front of a sensor or a series of sensors that block light. The sensitivity of the motion sensor and photocell may be adjusted through, for example, an application on an electronic device (e.g. smart device or laptop). Also, a server or application may decide if the situation or application warrants night use or twenty-four-hour operation of motion detection through alternate means such as photocell sensors. If night operation is selected, then the server or application will process detected photocell information to determine if motion was detected.

The sensor module 350 may include any number of other detectors or other sensors 359. Examples of other sensors 359 that may be used include, by way of illustration only and not by way of limitation, temperature sensors, video cameras, audio recorders, motion sensors, ambient light sensors, light sensors, humidity sensors, smoke detectors, and other sensors, such as for example, an Electric Field Proximity Sensing (EFPS) sensor to determine whether a person or object is nearby that is behind a wall.

The electronic lock system 300 includes a power supply 390 having a power generator 391 as a power source. The power generator 391 may include rechargeable batteries, for example, nickel cadmium (NiCd), lithium (Li), AA, AAA, and/or rechargeable capacitors, for example, supercapacitors (SC) or ultracapacitors. The power generator 391 may comprise of multiple battery types, for example, using a coin cell battery to operate some sensor components or to provide auxiliary power, while using a rechargeable Li battery to provide power for operating sensor module 350. The power supply 390 may be provide through frame reinforcer assembly 218 or connection port 243.

The exemplary one or more remote sensor devices 330 of the present disclosure need not be limited to simple camera components, for example, a microphone, speaker, and lens. The one or more remote sensor devices 330 may comprise of all components of sensor module 350 for collecting user interactions and authentication factors of individual 480.

Figure 4B:
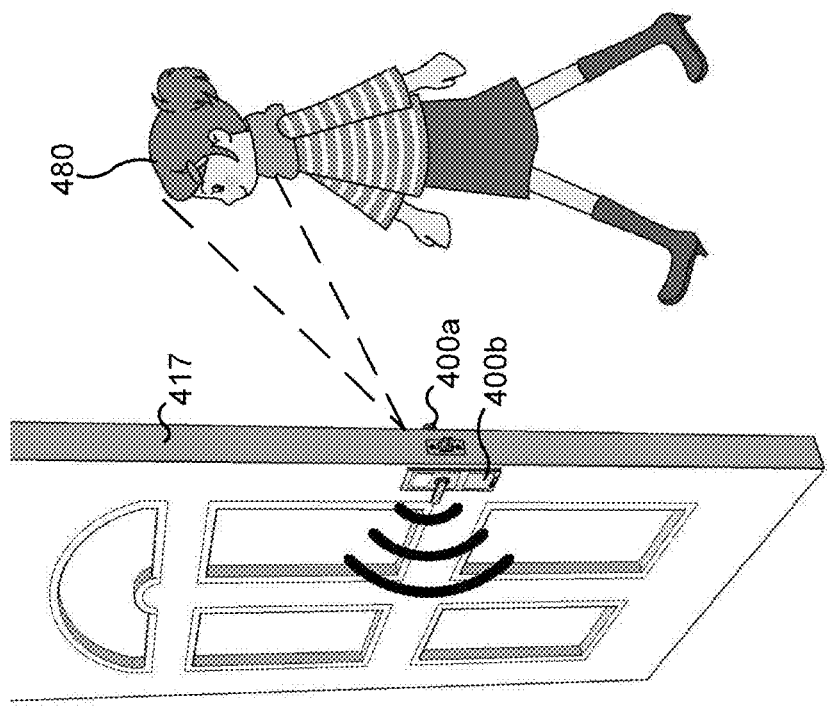
FIGS. 4A-4D illustrates an exemplary user interaction with the electronic lock system in accordance with one or more exemplary embodiments of the present disclosure.
Figure 4A:
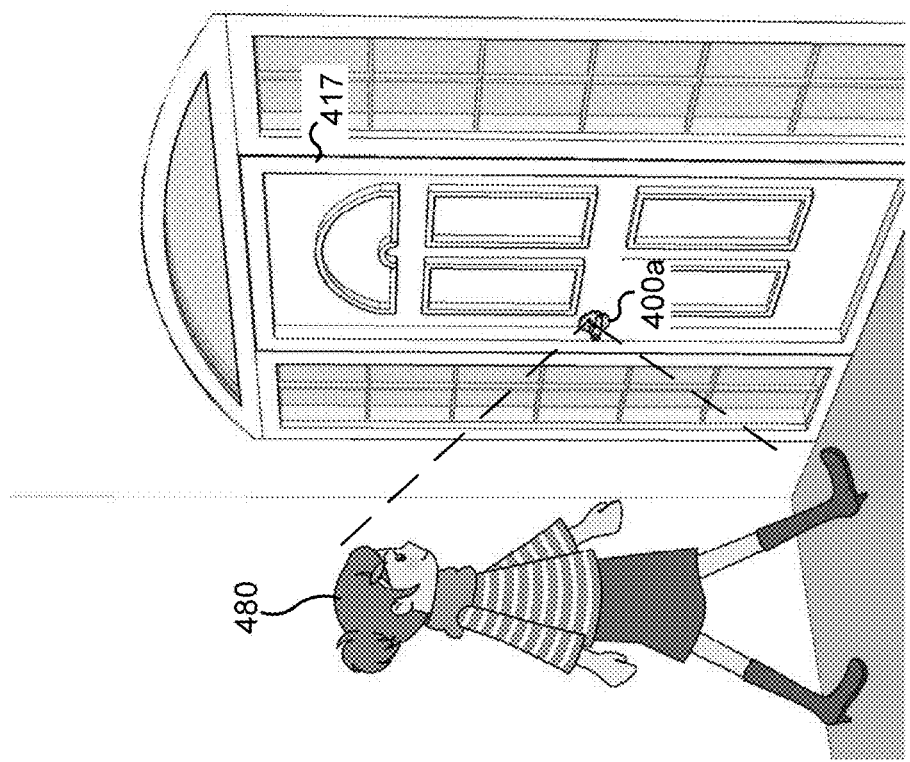

FIG. 4A-4D illustrates an exemplary embodiment of user interactions between an exterior electronic lock system 400*a* when communicably coupled to an interior electronic lock system 400*b* in accordance with one or more exemplary embodiments of the present disclosure. In FIG. 4A, individual 480 approaches exterior electronic lock system 400*a*. As shown in FIG. 4A, an individual 480 may approach door 417 having an exterior electronic lock system 400*a*. Once individual 480 is at a predetermined exterior electronic lock system 400*a*, the exterior electronic lock system 400*a* begins recording video of the individual 480 or entity interaction. The exterior electronic lock system 400*a* may then communicate with one or more local electronic devices 541, wireless user device 532, server 511, or interior electronic lock system 400*b*. In some aspects, as illustrated in FIG. 4B, an interior electronic lock system 400*b* may be installed on the opposite side of door 417 to provide visual or audio confirmation of an individual 480 located at a first predetermined distance from door 417.

Figure 4D:
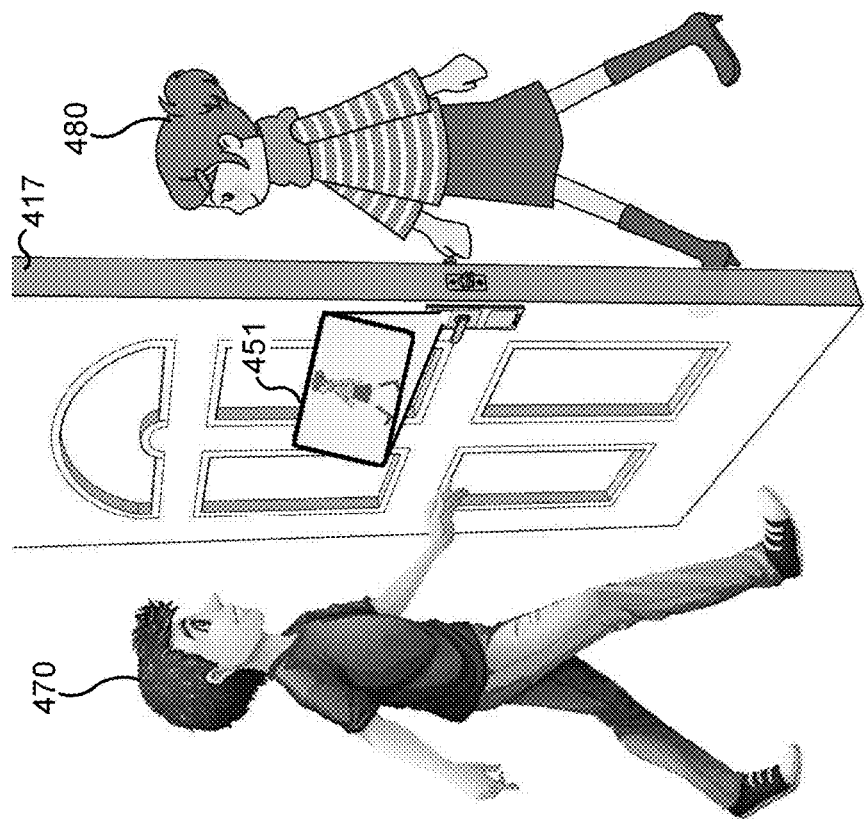
Figure 4C:
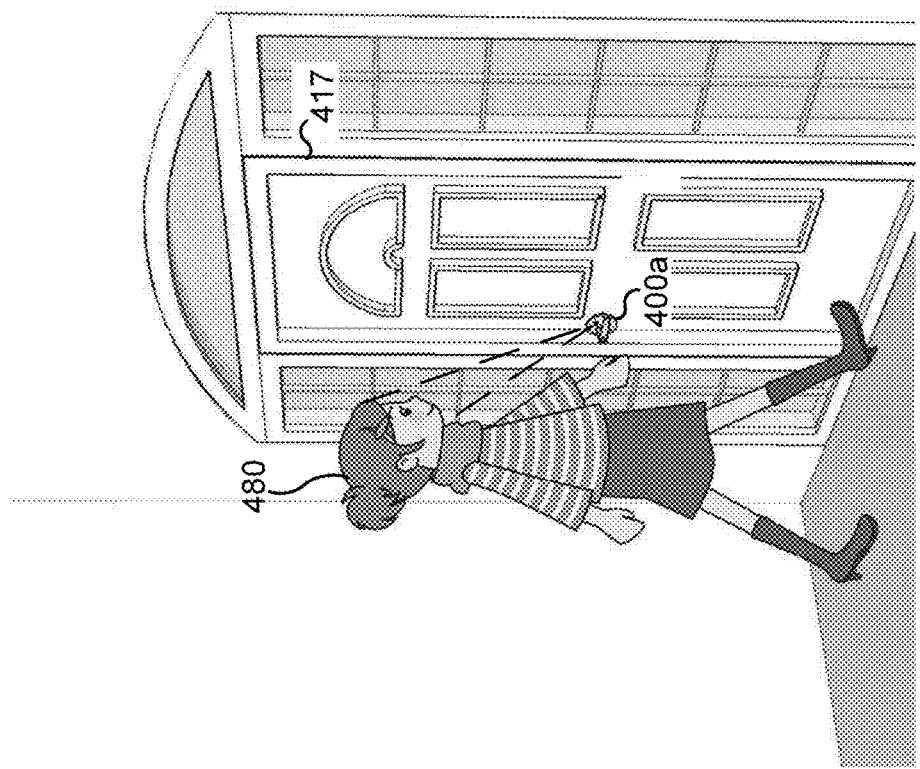

Referring to FIGS. 4C-4D, when individual 480 is within a second predetermined distance from door 417, the exterior electronic lock system 400*a* may proceed to process authentication factors (e.g. facial and image recognition) of individual 480. The exterior electronic lock system 400*a* may determine the identity of individual 480, perform one or more actions (e.g. playing a message, initiating two-way audio/video call, unlocking door 417, etc.,). The exterior electronic lock system 400*a* may communicate with one or more local electronic devices 541, wireless user device 532, server 511, or interior electronic lock system 400*b*. In some aspects, as illustrated in FIG. 4D, an interior electronic lock system 400*b* may be installed on the opposite side of door 417 to notify individual 470 through audio or video of the presence of individual 480 located at a second predetermined distance from door 417.

As shown in FIG. 4D, interior electronic lock system 400*b* may be configured to immediately display one or more detected events, activities, entity interactions, or individuals 480. The interior electronic lock system 400*b* may then provide visual or audio information to individual 470 on display 451. The individual 470 interaction with interior electronic lock system 400*b* may be learned by interior electronic lock system 400*b* or stored on storage device 502. The interior electronic lock system 400*b* may then learn user behavior to automate future interactions with individual 480, request individual 470 to identity individual 480 if unknown, or request whether to grant automated access to individual 480. The interior electronic lock system 400*b* may request individual 470 to define user access level (e.g. admin, guest, visitor, etc.,) for individual 480.

In some exemplary embodiments, the individual 470 may instead use wireless user device 532 to program exterior electronic lock system 400*a* to perform one or more actions based on authentication factors or entity interactions obtained from individual 480. The exterior electronic lock system 400*a* may request individual 470 to set user access levels for individual 480.

In some exemplary embodiments, the exterior electronic lock system 400*a* may be used to collect one or more shipping or tracking verification parameters, for example, shipping codes, barcodes, serial numbers, device id, product id, QR codes, 2-dimensional or 3-dimensional barcodes, electronic serial number (ESN), make, model, shipping address, personal information of owners, images, text, logos, product images, product text, shapes, package or box size, shape, color, and the like. In the event individual 480 is a delivery person, exterior electronic lock system 400*a* may scan the shipping or tracking verification parameters, for example, packaging text, barcodes, QR codes, tracking number, package label, shipping label, and other shipping or delivery information then notify individual 470 of the package information and individual 480. The individual 470 may be notified by text notification, pictures, audio, or video of the delivery may be collected and sent to individual 470 to verify the delivery and the time of delivery.

The exterior electronic lock system 400*a* may detect one or more verification parameters for a delivery and notify individual 470. The individual 470 may be notified through any remote computing device 531 or interior electronic lock system 400*a*. The exterior electronic lock system 400*a* may perform one or more actions based on authentication factors, verification parameters, entity interactions obtained from individual 480, or based on user preferences of learned user behavior of individual 470. The exterior electronic lock system 400*a* may further request individual 470 to set user access levels for the delivery or delivery person (e.g. individual 480).

Figure 5:
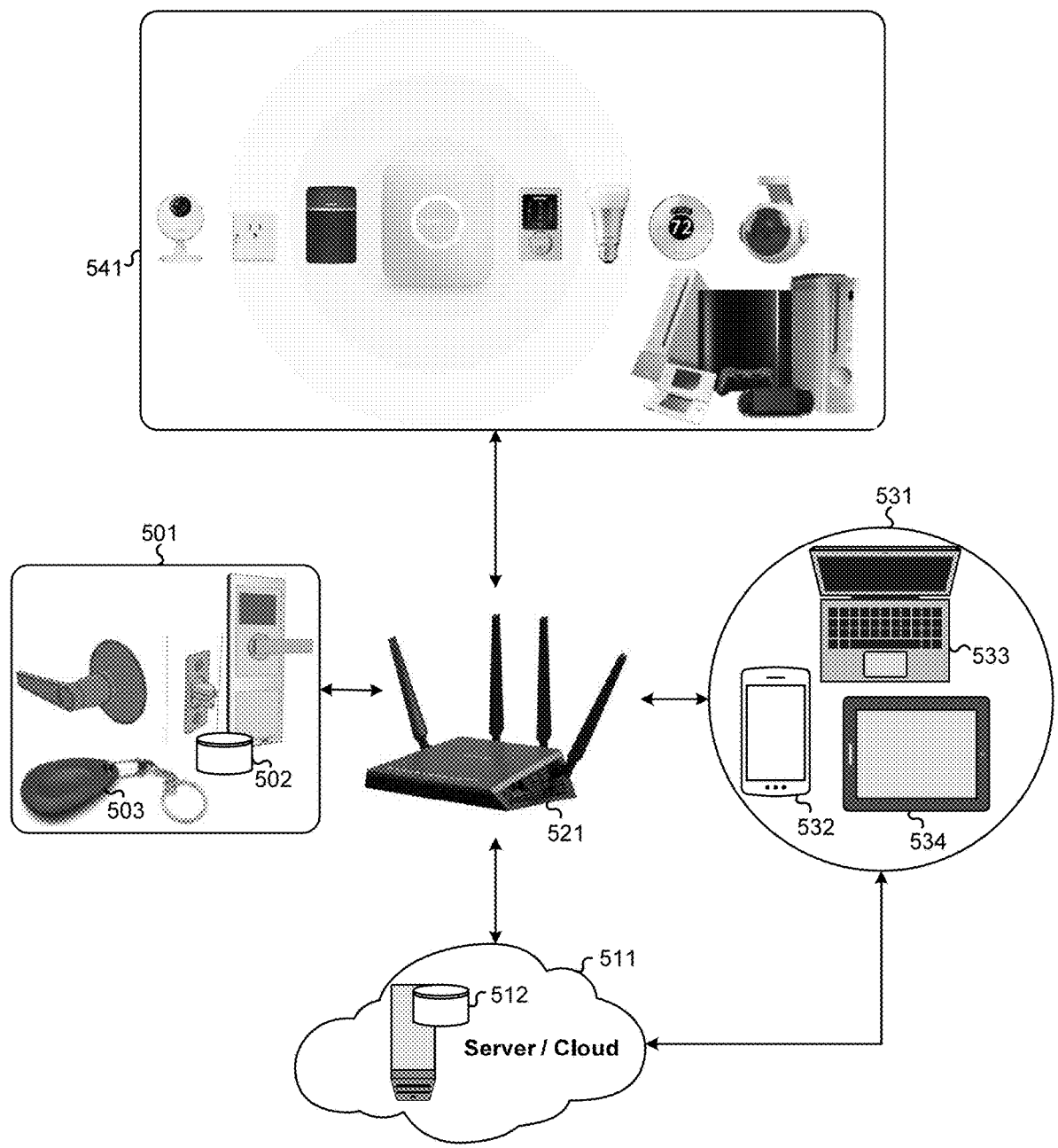
FIG. 5 illustrates an exemplary embodiment of the electronic lock system communicating with other smart devices or remote computing devices in accordance with one or more exemplary embodiments of the present disclosure.

FIG. 5 illustrates an exemplary embodiment of an electronic lock system 501 communicating with other smart devices or remote computing devices in accordance with one or more exemplary embodiments of the present disclosure. The electronic lock system 501 may refer to either an interior electronic lock system 200 or exterior electronic lock system 100. The electronic lock system 501 may comprise of frame reinforcer assembly 218. In the following exemplary embodiments, the description of the electronic lock system 501 may refer to one of the devices, for example, the interior electronic lock system 200 notifying the user 470 of an individual 480 or the exterior lock system 100 notifying the individual 480 by playing a message containing the location of the residence, a greeting or personal message for individual 480, or initiating a two-way audio call between user 470 and individual 480. Alternatively, the electronic lock system 501 may refer to the group of devices working together, for example, the exterior lock system 100 working together with interior lock system 200 to verify individual 480 in front of the door 417 and notify user 480 of the presence and identity of individual 480 through display 471.

Local electronic devices 541 may include, for example, IP cameras, smart outlets, smart switches, smart lightbulbs, smart locks, smart thermostats, video game consoles and smart TVs, smart blinds, garage door monitoring and controlling devices, smart refrigerators, smart washer/dryer, smart devices powered on solar energy, etc. and the like. The electronic lock system 501 may also connect to laptops 533, portable devices 534, wireless user device 532, and server 511 and/or server storage 512.

In some exemplary embodiments, electronic lock system 501 may wirelessly connect through Wi-Fi, LAN, WAN, Bluetooth, two-way pager, cellular connection, etc., to a computing device (e.g. electronic device 541 or remote computing device 531). The electronic lock system 501 may communicate with one or more electronic devices 541, remote computing devices 531, and servers 511 through, for example, wireless router 521. The electronic lock system 501 may learn user habits, patterns, and behavior by communicating with one or more electronic devices 541, remote computing devices 531, and servers 511 through, for example, a wireless router 521.

Moreover, the electronic lock system 501 may collect, store, and process user habits, patterns, and behavior to predict and/or learn appropriate actions based on user interactions with the electronic lock system 501, electronic devices 541, remote computing devices 531, and servers 511. For example, the electronic lock system 501 may collect, store, and process user interactions from, for example, remote computing device 531, exterior electronic lock system 100, server 511, wireless user device 532, electronic devices 541, or any combination of the above.

The electronic lock system 501 may communicate user interactions, habits, patterns, and behavior to server 511, electronic devices 541, remote computing devices 531, or the like for further processing. For example, exterior electronic lock system 100 usage days and times may be populated to offer user 470 possible scheduling times based on collected user interactions. Thus, user interactions may be cataloged or stored in one or more databases (e.g. electronic lock system storage 512, or server storage 512, etc.,) for mapping out user habits, patterns, and behavior to predict and/or learn appropriate actions and responses that may be taken by the electronic lock system 501, server 511, and/or communicated by the electronic lock system 501 or server 511 to one or more electronic devices 541, or remote computing devices 531 for taking one or more appropriate actions (e.g. notifying one or more users of electronic lock system 501 actions, collected video recordings or biometric information from individual 480, etc.,).

The electronic lock system 501 may notify one or more users when detected activity of an identified individual 480 conflicts with the status or location of the individual 480 or with the individual's 480 patterns or habits. User activity may be collected by electronic lock system 501 and/or one or more electronic devices 541, or remote computing devices 531.

The electronic lock system 501 may include a tamper-proof mechanism that may activate the electronic lock system 501 to play an alarm, and the camera to record video and stream to one or more remote computing devices 531, servers 511, or electronic devices 541 when the electronic lock system 501 is tampered with or damaged, and/or when an entry door or window is broken (e.g. glass break sound detection). In some exemplary embodiments, the exterior electronic lock system 100 or interior electronic lock system 200 may temporarily store video in a storage module or electronic lock system storage 502 upon loss of network or internet connection.

Furthermore, in some exemplary embodiments, the electronic lock system 501 may be in a normally dormant state (e.g. ECO Mode, Sleep Mode, etc.,). For example, the electronic lock system 501 may be off or substantially off (e.g. low power mode) until motion or sound triggers the electronic lock system 501 to activate. Once activated the electronic lock system 501 may attempt to use sensed information (e.g. biometric information, verification parameters) or authentication factors to initiate an audio or video intercom session (e.g. two-way audio) or play a greeting or message. The electronic lock system 501 may collect the user interaction or activity at the entry door 417 and send the communication as live audio, video stream, or recorded video clip or audio clip to one or more servers 511, remote computing devices 531, or electronic devices 541, or any combination thereof. The communication will initiate a video or audio teleconference with a user, using the microphone 451, camera 458, and speaker 452. The video or audio teleconference may be terminated when the individual 480 in front of the entry door 101 leaves, or when the user 470 terminates video or audio teleconference through, for example, an interaction with wireless user device 532 (e.g. finger press, eye motion, or other control command) or interior electronic lock system 200.

The electronic lock system 501 may be configured to wirelessly communicate and cooperate with electronic devices 541 in real-time based on collected environmental activity or stored visual, motion, audio, and environmental information in electronic lock system storage 502 or server storage 512. The processor 402, controller 454, and/or server 511 may operate the Smart Doorbell 450 to play a digital or analog chime, ring the manual doorbell chime 140, or collect environmental activity (e.g. video, audio, temperature, etc.,) to send to a computing device (e.g. doorbell module 401, electronic devices 541, remote computing devices 531, server 511, etc.,) based on triggered environmental activity or zone triggers as collected by the Smart Doorbell 450.

Other electronic devices 541 (e.g. security camera, thermostat, smoke detector, smart lock, smart TV, etc.,) may cooperate with or supplement sensor modules 350 to provide comprehensive information of environmental activity around a building or entry point (e.g. garage or entry door). In some exemplary embodiments, the electronic device 541 (e.g. security camera) may add additional monitoring (audio or video) information to allow the electronic lock system 501 to filter out a tenant's activity around a home to prevent latches 213 and latch bolt 211 from locking/unlocking. In some exemplary embodiments, the electronic lock system 501 may use stored information in electronic lock system storage 502 or server storage 512 to determine whether to lock/unlock latches 213 and latch bolt 211. Additionally, the electronic lock system 501 may use GPS or Bluetooth information from a remote computing device 531 (e.g. user's wireless user device) to determine whether to operate the electronic lock system 501.

The electronic lock system 501 may be configured to communicate between the above electronic devices 541 (e.g. security devices, smart thermostat, smart devices, or smart appliances) by sending and retrieving proximity information, schedule information, textual (e.g. email, SMS, MMS, text, etc.), visual, motion, or audio information, as well as user access information shared between electronic devices. For example, the electronic lock system 501 may be configured to be notified by these smart devices of exterior weather conditions, vehicle or user location, pedestrians, air quality, allergens/pollen, peak hours, etc. Notification may be made through text, email, visual, or audio information provided by remote computing devices 531, server 511, and/or electronic devices 541 or any other electronic device mentioned above. Once a smart device (e.g. security camera 541) detects an individual 480, environmental activity may be relayed to the electronic lock system 501, then to a server 511 or remote computing device 531 for requesting or determining an appropriate action/response.

In this way, the electronic lock system 501 acts as a hub for collecting and processing environmental activity from other electronic devices then prompting the server 511 or remote computing device 531 for control instructions to play a digital or analog chime, play a greeting or message, initiate an audio or video teleconference, ring/play a doorbell chime, or collect environmental activity (e.g. video, audio, temperature, etc.,) to send to a computing device (e.g. doorbell module 401, electronic devices 541, remote computing devices 531, server 511, etc.,). The electronic lock system 501 may perform an action based on user preferences or prompt a user for default or alternate action based on detected activity or user interaction. For example, an individual 480 or user 470 may configure the electronic lock system 501 to play live stream or record video of vehicles approaching a home or building. However, the electronic lock system 501 may first prompt a user or user(s) before enabling such functionality.

The electronic lock system 501 may be communicatively coupled to and controlled, programmed, or reprogrammed by electronic devices 541, remote computing devices 531, or by one or more servers 511 to collect such data or collect additional data. The electronic lock system 501 may also be operated by a key fob 503. In some exemplary embodiments, the key fob 503 may be a RFID card or RFID device that may be attached to a remote computing device 531. In some exemplary embodiments, the electronic lock system 501 may be programmed by the user to respond to the key fob 503 based on a schedule, geo-location of a user, user preferences, etc. Responses may include any combination of, streaming video, playing a message/greeting, opening/closing latches 213 or latch bolt 211, operating one or more electronic device 541 (e.g. turning on a smart lamp, operating a smart appliance, smart switch, etc.,), and the like.

In some exemplary embodiments, the electronic lock system 501 may take a snapshot of the individual 480, processes facial features of the individual 480, and create a digital photo id, digital access id, or the like, for imprinting on an access card, key card, or key fob 503. The access id may be a physical type of id (e.g. key fob) or a digital type of id (e.g. access through facial recognition). One or more buildings or other electronic lock system 501 may be configured to accept the generated access id (e.g. key fob) or access cards created by the electronic lock system 501. In this way, the electronic lock system 501 may create physical access cards for entering through one or more other entry points (e.g. an entry door or garage). A miniature or portable printing device may be attached or built into the electronic lock system 501 (e.g. connection port 243 of interior electronic lock 200) for printing the snapshot of the individual 480 to create the access card, key fob 503, or key card. To access a building, the individual 480 may, for example, download an APP for the electronic lock system 501 or receive permission to access and download the APP through a text or email message. The individual 480 may then provide personal information, for example, phone number, name, email, address, date of birth, driver license, social security number, etc., to verify their identity and receive authorization to access the building. Upon providing the personal information and receiving authorization, the electronic lock system 501 may verify the identity of the individual by taking a snapshot and sending a verification code to their remote computing device 531.

The electronic lock system 501 may use a shared IP or dedicated IP. The electronic lock system 501 having a fixed or static IP may benefit from numerous advantages, such as but not limited to, less downtime or power consumption from IP address refreshes, Private SSL Certificate, Anonymous FTP, Remote access, and access when the domain name is inaccessible.

The electronic lock system 501 may further be communicably coupled to one or more door sensors and window sensors. The door sensors and window sensors may notify the electronic lock system 501 in the event of a window or door opening, the electronic lock system 501 may then turn on and begin capturing audio and video of the event and concurrently or subsequently notify one or more electronic devices 541, remote computing devices 531, servers 511, etc.

FIG. 6 illustrates a first exemplary method 600 of using the electronic lock system 300 in accordance with one or more embodiments of the present disclosure. For illustration purposes, and not by way of limitation, the electronic lock system 300 may refer to exterior lock system 100. The electronic lock system 300 may refer to interior lock system 200, interior lock system 200 may add or share hardware and communication capabilities with exterior lock system 100. Therefore, the exemplary electronic lock system 300 may refer to either the interior lock system 200 or the exterior lock system 100. Method 600 may apply to other exemplary embodiments of the electronic lock system as disclosed in FIGS. 1A-5. Method 600 may be used independently or in combination with other methods or process for operating one or more electronic lock systems 300, sensor modules 350, remote sensor devices 330, remote cameras, computing devices, smart devices, or other electronic devices or components. For explanatory purposes, the example process 600 is described herein with reference to electronic lock system 300; however, the example process 600 is not limited to interior lock system 200 or exterior lock system 100, and the example process 600 may be performed by one or more computing devices, smart devices, or other electronic devices or components shown in FIGS. 1A-5. For example, remote computing device 531 or electronic device 541 may collect one or more interactions and verification parameters from an individual 480. For explanatory purposes, the example process 600A and 600B are described herein with reference to wireless user device 280, ASD system 501 (doorbell module 401, and Smart Doorbell 401) of FIGS. 1 and 4-5; however, the example process 600A and 600B is not limited to wireless user device 280, and ASD system 501, and the example process 600A and 600B may be performed by one or more computing devices, smart devices, or other electronic devices or components shown in FIGS. 1-5.

Moreover, in process 600, one or more sensors from the electronic lock system 300, electronic devices 541, or remote computing devices 531, may be used to collect, for example, audio information, visual information, and environmental information to enable image, biometric, or voice recognition technology. The sensors may be one or more of a speaker, a microphone, a camera, or a motion sensor, temperature sensor, humidity sensor, and wind sensor. The sensitivity of the sensors may be adjusted (or accounted for) to discriminate between the presence of a human, objects, packages, and the like.

The electronic lock system 300 may process the collected interactions and verifications parameters locally or relay the data to be stored and updated on one or more networks, for example, server 511, or other ID, service, or device verification network. The example process 600 is not limited to the electronic lock system 300, the one or more blocks of the example process 600 may be performed, in part or in whole, by one or more computing devices, smart devices, or other electronic devices or components as disclosed in the cross-referenced applications incorporated by reference. Further for explanatory purposes, the blocks of the example process 600 are described herein as occurring in serial, or linearly. However, multiple blocks of the example process 600 may occur in parallel. In addition, the blocks of the example process 600 may be performed a different order than the order shown and/or one or more of the blocks of the example process 600 may not be performed. Further, any or all blocks of example process 600 may further be combined and done in parallel, in order, or out of order.

Each block shown in FIG. 6 represents one or more processes, methods or subroutines, carried out in the exemplary method. FIGS. 1A-5 show exemplary embodiments of carrying out the methods of FIG. 6 for detecting, collecting, processing, and transmitting information. The exemplary method may begin at block 611.

Referring to FIG. 6, the exemplary method of using the electronic lock system 300 may begin with block 611 of detecting user interaction(s) or activity at a first predetermined distance from a current user. The electronic lock system 300 may detect a first activity, for example, one or more environmental activity, motion, sound, and/or environmental conditions in a first zone. The electronic lock system 300 may collect, for example, individual activity, text, logo, audio, and/or ambient lighting, followed by block 613

In some exemplary embodiments, the user interaction may be a service/delivery request from the current user (e.g. individual 480), for example, scanning a package/item to operate the electronic lock system 300. The service/delivery request may be processed after collecting primary and secondary verification parameters by the electronic lock system 300. Thus, the request may include input or interaction information and verification parameters collected by electronic lock system 300. The user interaction and requests may be verified with location information of current user or session. The service/delivery request by individual 480 may be verified by the electronic lock system 300 with location information and verification parameters. For example, an individual 480 delivering a package (and requesting verification of the delivery) may be requested by the electronic lock system 300 to provide biometric information and provide the shipping label of the package for electronic lock system 300 to scan and verify. Upon verification the electronic lock system 300 may perform an unlock action and record video footage or take a series of snapshots of the delivery. The individual 480 may open door 417 to complete the delivery while individual 470 receives a notification that the package/item was delivered, or services rendered.

At block 613 the electronic lock system 300 performs a first action of collecting verification parameters, for example, user identification, service/product identification, other visual information, biometric information, and audio information of user interaction(s) or activity. The electronic lock system 300 may collect and verify the current user through verification parameters either locally based on stored and updated information on electronic lock system 300, or the electronic lock system 300 may communicate with one or more networks to verify, update, or store the data on, for example, server 511, or other ID or device verification network. The verification parameters may be collected by the electronic lock system 300, one or more servers 511, electronic devices 541, remote computing devices 531, defined by the user, or any combination thereof. The first activity and all subsequent activities may be collected and stored on one or more storage device (e.g. locally accessibly storage 502 or remotely accessibly storage 512).

At block 615 the electronic lock system 300 sends a notification alert and information about the first activity (e.g. visual information, audio information, etc.,) to one or more servers 511, electronic devices 541, or remote computing devices 531, interior electronic device 200, or any combination thereof.

At block 617, the electronic lock system 300 may detect user interaction(s) or activity at a second predetermined distance from the current user. At the second predetermined distance additional verification parameters may be verified, or finer details of an individual 480 or package/item may be collected and verified. Based on the proximity of the individual 480 to the electronic lock system 300, the electronic lock system 300 may detect a second activity, for example, additional or finer details of a current user's biometric information, voice recognition, service/product identification for delivery persons or service persons.

At block 623 the electronic lock system 300 performs a second action of collecting additional verification parameters at the second predetermined distance from the current user, for example, identification parameters may include (but not be limited to), visual, audible, biometric information, voice recognition, include structural properties: body shape, height, appearance, height, color, service tags, uniforms, among other readily recognizable features. For packages, features that may be used as identification parameters may include structural properties: shape, body, appearance, color, size, shipping or tracking numbers, shipping codes, barcodes, serial numbers, device id, product id, QR codes, 2-dimensional or 3-dimensional barcodes, electronic serial number (ESN), make, model, shipping address, personal information of owners, images, text, logos, product images, product text, package label, shipping label, and other shipping or delivery information. Other features, individual features, environmental features, environmental conditions, and environmental activity may be collected as disclosed in the applications incorporated by reference, for example, Smart Cam Device and Method (application Ser. No. 15/625,601), Smart Register Device and Method (application Ser. No. 16/219,626). In some exemplary embodiments, the interior electronic lock system 200 or exterior lock system 100 may function as an electronic device of entity 180 or service group 160 of Access Verification Device and Method (application Ser. No. 16/418,998), incorporated by reference.

At block 625, the electronic lock system 300 may verify the current user through verification parameters either locally based on stored and updated information on electronic lock system 300, or the electronic lock system 300 may communicate with one or more networks to verify, update, or store the data on, for example, server 511, or other ID or device verification network. The verification parameters may be collected by the electronic lock system 300, one or more servers 511, electronic devices 541, remote computing devices 531, defined by the user, or any combination thereof. The first activity and all subsequent activities may be collected and stored on one or more storage device (e.g. locally accessibly storage 502 or remotely accessibly storage 512). Upon verify the current user, at block 627, the electronic lock system 300 grants access rights based on the user defined settings for the current user stored on the electronic lock system 300, server 511, locally accessibly storage 502, remotely accessibly storage 512, or other ID or device verification network.

At block 629, the electronic lock system 300 may request secondary verification parameters (e.g. device identifiers, users list, ownership information) or collect additional primary or secondary verification parameters from the current user or session to authenticate the current user identity. Based on the authentication requirements of the electronic lock system 300, server 511, locally accessibly storage 502, remotely accessibly storage 512, or other ID or device verification network. If requested by the aggregate server 250 or service provider 220, at blocks 425 and 427 the aggregate network sensor system 300 or aggregate server 250 may request and collect additional primary or secondary verification parameters from current user or session.

In block 631, the electronic lock system 300 may play an audio or video message for current user, initiate two-way audio or video telephony. Based on verification parameters, the electronic lock system 300 may also send a control signal to other smart devices or appliances (e.g. ringing a smart doorbell, operating a smart thermostat, or operating one or more smart security devices).

At block 633, the electronic lock system 300 may notify (e.g. by text, voice, animation, clip, or video as disclosed in FIGS. 1A-5) and/or request further action from the electronic lock system 300, server 511, electronic devices 541, or remote computing devices 531, or any combination thereof. The electronic lock system 300 may provide a live broadcast of the current user interactions to one or more electronic devices 541, or remote computing devices 531, or any combination thereof.

The first entity interaction and all subsequent interactions from the current user, as well as primary and secondary verification parameters may be collected, streamed or broadcast, and/or recorded at any time (e.g. concurrently with, prior to, or after any block) in process 600. Moreover, at any time (e.g. concurrently with, prior to, or after any block) in process 600, the activity may be collected, stored, updated or allocated within a database of the electronic lock system 300, sever 511, or stored on one or more servers, electronic devices, as defined by the user, or any combination thereof.

An entity may be a human, object (e.g. box, package), pedestrian, vehicle, robot, car, motorcycle, pet, or any animal or device capable of being identified through image recognition, a tag, barcode, serial number, or embedded or implanted electronic device or sensor for wirelessly connecting to a network or joining a wireless network to be monitored.

A remote computing device may be a smart device, a smart phone, a vehicle, a tablet, a laptop, a TV, or any electronic device capable of wirelessly connecting to a network or joining a wireless network. The remote computing device may be wirelessly and communicably associated to an individual either through a network or server (e.g. through a user account on the server, or WiFi™ login information), or through visual information collected by the SRV device. The terms remote computing device, individual, and user may be used interchangeably throughout the present disclosure.

The server may be a computer that provides data to other computers. It may serve data to systems on a local area network (LAN) or a wide area network (WAN) over the Internet. The server may comprise of one or more types of servers (e.g. a web server or file server), each running its own software specific to the purpose of the server for sharing services, data, or files over a network. The server may be any computer configured to act as a server (e.g. a desktop computer, or single or multiple rack-mountable servers) and accessible remotely using remote access software.

Proximity determination may be made by using a combination of visual, motion, and audio information. The sensor components or sensor modules, server, remote computing device may define a virtual perimeter for a real-world geographic area. The aggregate network sensor system or aggregate server may also respond to geofencing triggers. Geofencing may be accomplished using location aware devices through, for example, GPS, RFID technology, wireless network connection information, cellular network connection information, etc. Visual, motion, and audio information may be collected by the aggregate network sensor system or aggregate server to substantiate an entity/service group/individual(s)/computing device(s) physical location.

The network may be a network of computers, a local area network (LAN), a wide area network (WAN), or an Intranet, or a network of networks, for example, the Internet. Moreover, various interfaces may be used to connect to the network such as cellular interfaces, WiFi™ interfaces, Infrared interfaces, RFID interfaces, ZigBee interfaces, Bluetooth interfaces, Ethernet interfaces, coaxial interfaces, optical interfaces, or generally any communication interface that may be used for device communication. The purpose of the network is to enable the sharing of files and information between multiple systems.

The term "within a proximity", "a vicinity", "within a vicinity", "within a predetermined distance", and the like may be defined between about 0.1 meters and about 50 meters. The term "coupled" is defined as connected, whether directly or indirectly through intervening components, and is not necessarily limited to physical connections. The connection may be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder but may have one or more deviations from a true cylinder. The term "comprising," when utilized, means "including, but not necessarily limited to"; it specifically indicates open-ended inclusion or membership in the so-described combination, group, series and the like.

The term "a predefined distance" may be defined as the distance of an approaching individual as the individual nears one or more aggregate network sensor system, or a traceable object used in determining environmental features and/or conditions. The predefined distance may be defined as between about 0.1 meter and about 50 meters.

The terms "predefined" or "predetermined" period of time may be defined to be between about 0.5 second to about 10 minutes.

The processor of the electronic lock system 300, remoting computing device 531, or server 511 may perform an action (e.g. first, second, third, etc.) comprising of a single action, set of actions, or a list or blend of actions based on one or more of: a proximity of an individual(s) or remote computing device(s), a time of day, environmental activity and/or environmental features, visual, motion, or audio information, a schedule, user(s) preferences, and the state and settings of entry point devices, interior electronic lock system, exterior electronic lock system, and local electronic devices, as described above. The action may be any one of: locking/unlocking the interior electronic lock, exterior electronic lock, one or more other smart locks, operating smart lights, fully or partially opening one or more garage doors, ringing a digital smart doorbell chime, ringing a manual in-building mechanical or digital doorbell chime, operating a thermostat, smart TV, or other local electronic devices. The action may also include playing a music file, sound file, greeting, initiating two-way audio or video teleconference, recording video or message in response to a detected user, individual, package, deliver person, change in occupancy and/or environmental conditions and/or features, or in response to a detected or defined audio, proximity, visual, or motion trigger. The action may also comprise of controlling other smart devices as communicated through the electronic lock system or server, for example, turning on a ceiling fan, outlet, and communicating with remote computing device(s) or detected individual(s). The action may also comprise of sending an email, text, or SMS to a server, smart devices, or remote computing device(s).

Those of skill in the art will appreciate that the foregoing disclosed systems and functionalities may be designed and configured into computer files (e.g. RTL, GDSII, GERBER, etc.) stored on computer-readable media. Some or all such files may be provided to fabrication handlers who fabricate devices based on such files. Resulting products include semiconductor wafers that are separated into semiconductor dies and packaged into semiconductor chips. The semiconductor chips are then employed in devices, such as, an IoT system, the SRV device, or a combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor, and the storage medium may reside as discrete components in a computing device or user terminal.

Further, specific details are given in the description to provide a thorough understanding of the embodiments. However, embodiments may be practiced without these specific details. For example, well-known circuits, processes, algorithms, structures, and techniques have been shown without unnecessary detail to avoid obscuring the embodiments. This description provides example embodiments only and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Where applicable, various embodiments provided by the present disclosure may be implemented using hardware, software, or combinations of hardware and software. In addition, where applicable, the various hardware components and/or software components, set forth herein, may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software or application, in accordance with the present disclosure, such as program code and/or data, may be stored on one or more computer-readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation, or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the present disclosure, the disclosure, the present disclosure, other variations thereof and alike are for convenience and do not imply that a disclosure relating to such phrase(s) is essential to the present disclosure or that such disclosure applies to all configurations of the present disclosure. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

The embodiments shown and described above are only examples. Many details are often found in the art such as the other features of an image device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed:

1. A smart lock device comprising:
   at least one memory;
   wherein the smart lock is positioned on a moveable barrier for operating and moving a fastener, wherein the fastener secures the moveable barrier to a structure;
   wherein the fastener comprises of a latch and a latch bolt, wherein the latch and latch bolt are mechanically and electrically operable to move;
   one or more sensors, for acquiring at least one of: one or more verification parameters, a visual information, or an audio information from a surrounding environment of a current user;
   a processor, coupled to the at least one memory, the processor configured to:
   receive, from the one or more sensors, a first verification parameter and a second verification parameter from the current user, wherein the first verification parameter includes biometric information collected from the current user located at a first predetermined distance from the moveable barrier, and wherein the second verification parameter includes one or more textual information or visual information for a delivery obtained from at least one of: a remote computing device, an item, or a package located at a second predetermined distance from the moveable barrier; and
   wherein the processor is configured to cause:
   a first action upon detecting the current user at a first predetermined distance within a first geographical zone; wherein the first action comprises of collecting, as the first verification parameter, visual information or audio information from the current user used for facial recognition technology, image recognition technology, or voice recognition technology;
   wherein the first action further includes moving the latch bolt of the fastener to an open position in response to facial recognition verification; and
   a second action upon detecting textual information or visual information from at least one of: the remote computing device, item, or package for delivery at a second predetermined distance within a second geographical zone;
   wherein the second action comprises of moving the latch of the fastener to an open position in response to receiving, as the second verification parameter, textual information or visual information from the remote computing device, item, or package for delivery.

2. The smart lock device of claim 1, further comprising a network module coupling the smart lock device to a local area network wherein the smart lock device is communicably coupled to at least one of a wireless user device or a server.

3. The smart lock device of claim 2, wherein the second action further comprises of operating one or more: other smart locks, smart lights, smart security devices, fully or partially opening or closing one or more garage doors, smart doorbells, thermostats, TVs, playing a music file, sound file, greeting, initiating two-way audio or video teleconference, recording video or message in response to a detected user, individual, package, deliver person, operating one or more other electronic devices, smart devices or appliances.

4. The smart lock device of claim 1, wherein at least one of user preference or user behavior is evaluated, or the current user is prompted to verify the second verification parameter prior to moving the latch of the fastener to an open position.

5. The smart lock device of claim 2, wherein the second action further includes detecting, as the second verification parameter, one or more of: 2-dimensional or 3-dimensional barcodes, tracking number information, shipping information, package label, shipping label, product serial number, make, model, product images, product text, or product logos for verifying an item or package for delivery.

6. The smart lock device of claim 2, wherein the first action further includes at least one of sending a notification to the wireless user device, remote computing device, the server, or a smart device; and wherein the notification includes sending the visual information, the audio information, or both, from the surrounding environment of the current user at the first predetermined distance.

7. The smart lock device of claim 6, wherein the one or more sensors is one of a speaker, a microphone, a camera, a biometric sensor, a motion sensor, a temperature sensor, and a humidity sensor, and wherein the one or more sensors enable biometric recognition technology, image recognition technology, or voice recognition technology.

8. The smart lock device of claim 7, wherein a combination of image recognition technology, biometric recognition technology, and voice recognition technology and an ability to adjust the sensitivity of the one or more sensors enables the smart lock device to discriminate between the presence of a human being, a package for delivery, and pets or animals in the first geographical zone and the second geographical zone and wherein the discrimination determines the occurrence of collection of verification parameters and the sending of the visual information, the audio information, or both, from the surrounding environment of the current user at the second predetermined distance.

9. The smart lock device of claim 8, wherein the first verification parameter is compared against a database of stored verification parameter information on the server or on at least one memory of the smart lock device.

10. The smart lock device of claim 8, wherein the second verification parameter is compared against a database of stored verification parameter information on the server or on at least one memory of the smart lock device.

11. A method comprising:
acquiring, by a smart lock, at least one of: one or more verification parameters, a visual information, or an audio information from a surrounding environment of a current user; and
wherein the smart lock comprising of a latch and a latch bolt, wherein the latch and latch bolt are mechanically and electrically operable to move to secure a moveable barrier to a structure;
receiving by the smart lock a first verification parameter and a second verification parameter from the current user, wherein the first verification parameter includes biometric information collected from the current user located at a first predetermined distance from the moveable barrier, and wherein the second verification parameter includes one or more textual information or visual information for a delivery obtained from at least one of: a remote computing device, an item, or a package located at a second predetermined distance from the moveable barrier; and
performing a first action upon detecting the current user at a first predetermined distance within a first geographical zone, wherein the first action comprises of collecting, as the first verification parameter, visual information or audio information from the current user used for facial recognition technology, image recognition technology, or voice recognition technology;
wherein the first action further includes moving the latch bolt of the fastener to an open position in response to facial recognition verification; and
performing a second action upon detecting textual information or visual information from at least one of: the remote computing device, item, or package for delivery at a second predetermined distance within a second geographical zone;
wherein the second action further comprises of moving the latch to an open position in response to receiving, as the second verification parameter, textual information or visual information from the remote computing device, item, or package for delivery.

12. The method of claim 11, wherein the second action further comprises of operating one or more: other smart locks, smart lights, smart security devices, fully or partially opening or closing one or more garage doors, smart doorbells, thermostats, TVs, playing a music file, sound file, greeting, initiating two-way audio or video teleconference, recording video or message in response to a detected user, individual, package, deliver person, operating one or more other electronic devices, smart devices or appliances.

13. The method of claim 11, wherein the second action further comprises of evaluating at least one of user preference, user behavior, or prompting the current user to verify the second verification parameter prior to moving the latch to an open position.

14. The method of claim 11, wherein the second action further includes detecting, as the second verification parameter, one or more of: 2-dimensional or 3-dimensional barcodes, tracking number information, shipping information, package label, shipping label, product serial number, make, model, product images, product text, or product logos for verifying an item or package for delivery.

15. The method of claim 11, wherein the first action further includes at least one of sending a notification to a wireless user device, the remote computing device, the server, or a smart device; and wherein the notification includes sending the visual information, the audio information, or both, from the surrounding environment of the current user at the first predetermined distance.

16. The method of claim 15, wherein the smart lock further comprises of one or more sensors, and wherein a combination of image recognition technology, biometric recognition technology, and voice recognition technology and an ability to adjust the sensitivity of the one or more sensors enables the smart lock device to discriminate between the presence of a human being, a package for delivery, and pets or animals in the first geographical zone and the second geographical zone, and wherein the discrimination determines the occurrence of collection of verification parameters and the sending of the visual information, the audio information, or both, from the surrounding environment of the current user at the second predetermined distance.

17. The method of claim 16, further comprising of comparing the first verification parameter against a database of stored verification parameter information on the server or on at least one memory of the smart lock device.

18. The method of claim 16, further comprising of comparing the second verification parameter against a database of stored verification parameter information on the server or on at least one memory of the smart lock device.

19. A non-transitory machine-readable medium comprising instructions stored therein, which, when executed by one or more processors of a processing system cause the one of more processors to perform operations comprising:
  acquiring, by a smart lock, at least one of; one or more verification parameters, a visual information, or an audio information from a surrounding environment of a current user; and
  wherein the smart lock comprising of a latch and a latch bolt, wherein the latch and latch bolt are mechanically and electrically operable to move to secure a moveable barrier to a structure;
  receiving by the smart lock a first verification parameter and a second verification parameter from the current user, wherein the first verification parameter includes biometric information collected from the current user located at a first predetermined distance from the moveable barrier, and wherein the second verification parameter includes one or more textual information or visual information for a delivery obtained from at least one of: a remote computing device, an item, or a package located at a second predetermined distance from the moveable barrier; and
  performing a first action upon detecting the current user at a first predetermined distance within a first geographical zone, wherein the first action comprises of collecting, as the first verification parameter, visual information or audio information from the current user used for facial recognition technology, image recognition technology, of voice recognition technology;
  wherein the first action further includes moving the latch bolt of the fastener to an open position in response to facial recognition verification; and
  performing a second action upon detecting textual information or visual information from at least one of: the remote computing device, item, or package for delivery at a second predetermined distance within a second geographical zone;
  wherein the second action comprises of moving the latch to an open position in response to receiving, as the second verification parameter, textual information or visual information from the remote computing device, item, or package for delivery.

20. The non-transitory machine-readable medium of claim 19, wherein the second action further includes detecting, as the second verification parameter, one or more of: 2-dimensional or 3-dimensional barcodes, tracking number information, shipping information, package label, shipping label, product serial number, make, model, product images, product text, or product logos for verifying an item of package for delivery; and wherein the first action further includes at least one of sending a notification to a remote computing device, a server, or a smart device; and wherein the notification includes sending the visual information, the audio information, or both, from the surrounding environment of the current user at the first predetermined distance.

21. The non-transitory machine-readable medium of claim 19, wherein the second action further comprises of operating one or more: other smart locks, smart lights, smart security devices, fully or partially opening or closing one or more garage doors, smart doorbells, thermostats, TVs, playing a music file, sound file, greeting, initiating two-way audio or video teleconference, recording video or message in response to a detected user, individual, package, deliver person, operating one or more other electronic devices, smart devices or appliances.

22. The non-transitory machine-readable medium of claim 19, wherein the smart lock further comprises of one or more sensors, and wherein a combination of image recognition technology, biometric recognition technology, and voice recognition technology and an ability to adjust the sensitivity of the one or more sensors enables the smart lock device to discriminate between the presence of a human being, a package for delivery, and pets or animals in the first geographical zone and the second geographical zone, and wherein the discrimination determines the occurrence of collection of verification parameters and the sending of the visual information, the audio information, or both, from the surrounding environment of the current user at the second predetermined distance; and wherein the second action further comprises of evaluating at least one of user preference, user behavior, or prompting the current user to verify the second verification parameter prior to moving the latch to an open position.

23. The non-transitory machine-readable medium of claim 22, further comprising of comparing the first verification parameter against a database of stored verification parameter information on the server or on at least one memory of the smart lock device, and comparing the second verification parameter against a database of stored verification parameter information on the server or on at least one memory of the smart lock device.

* * * * *